Nov. 22, 1960 W. HECOX ET AL 2,961,096
HIGH-SPEED CHECKWEIGHING AND CLASSIFYING SYSTEM
Filed Jan. 22, 1957 13 Sheets-Sheet 1
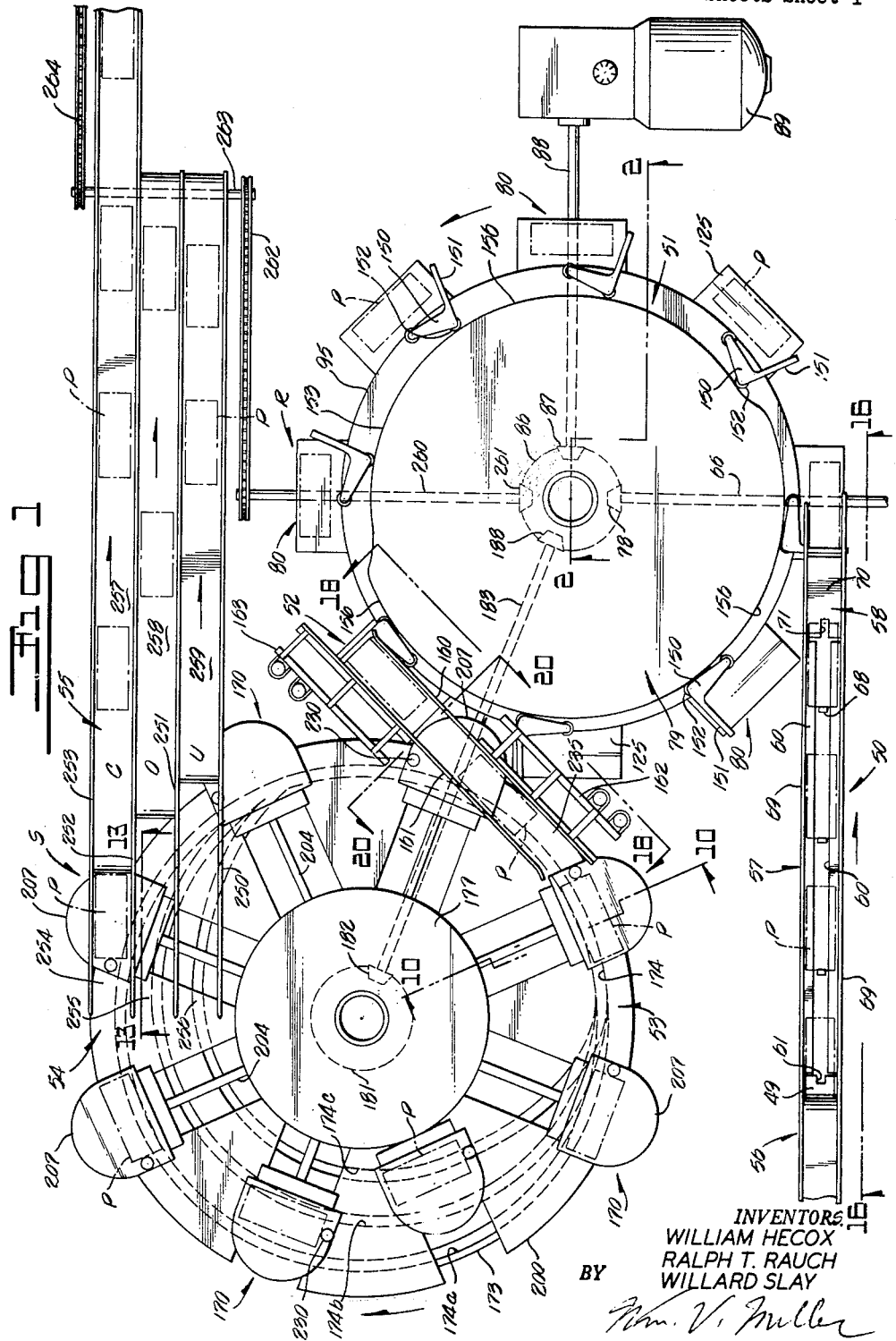
INVENTORS.
WILLIAM HECOX
RALPH T. RAUCH
WILLARD SLAY
BY
ATTORNEYS.

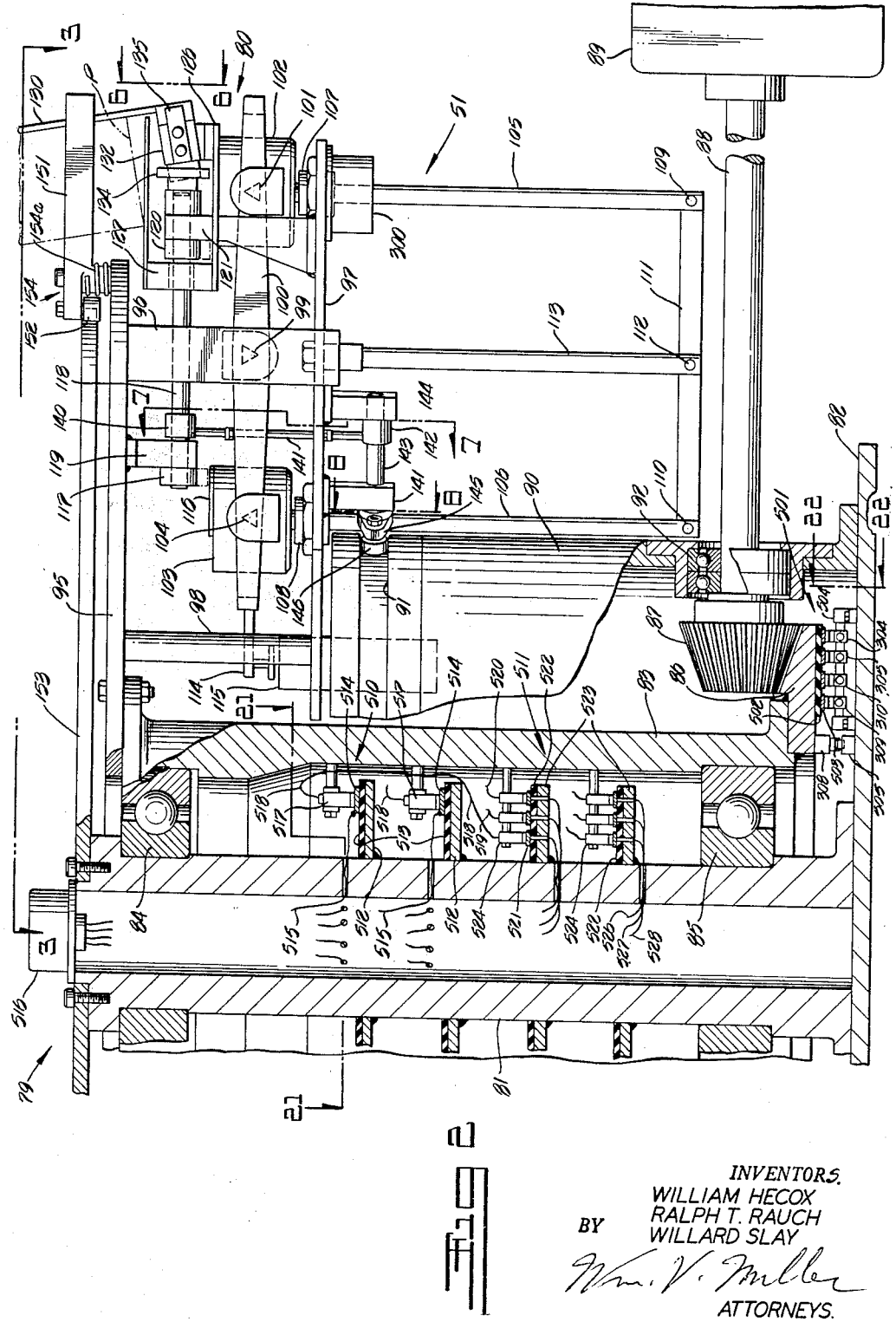

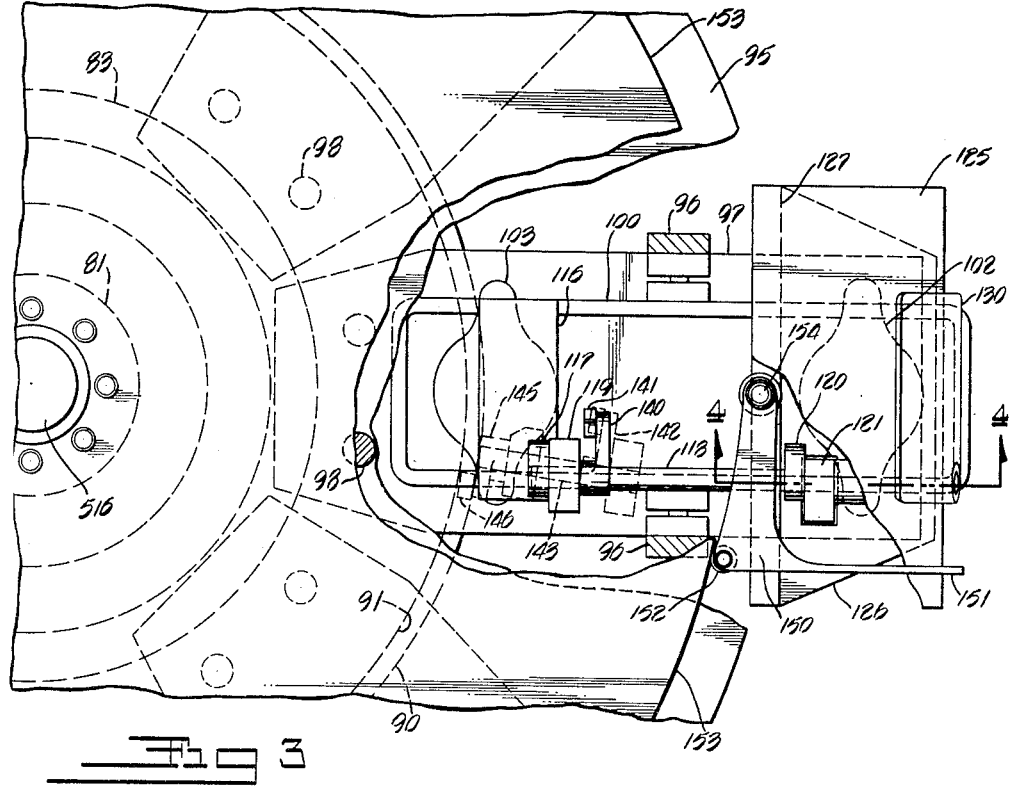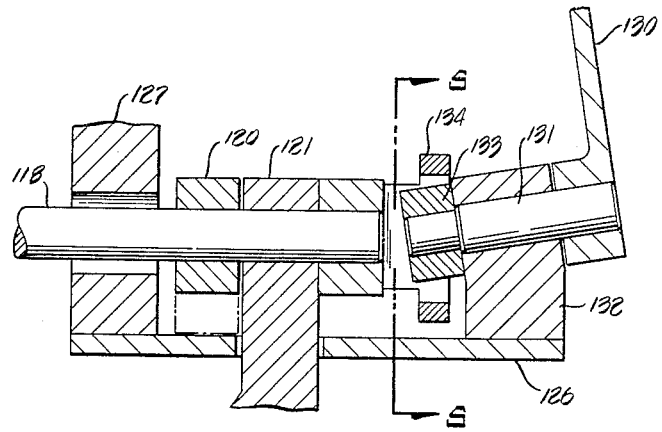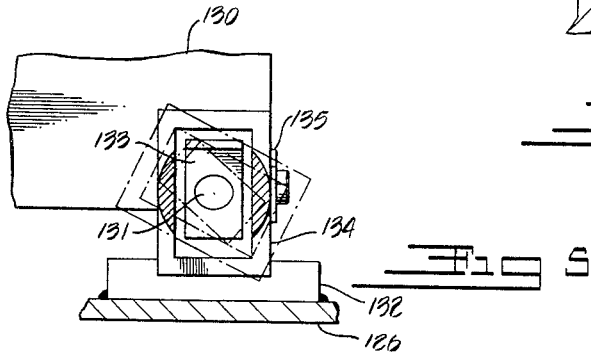

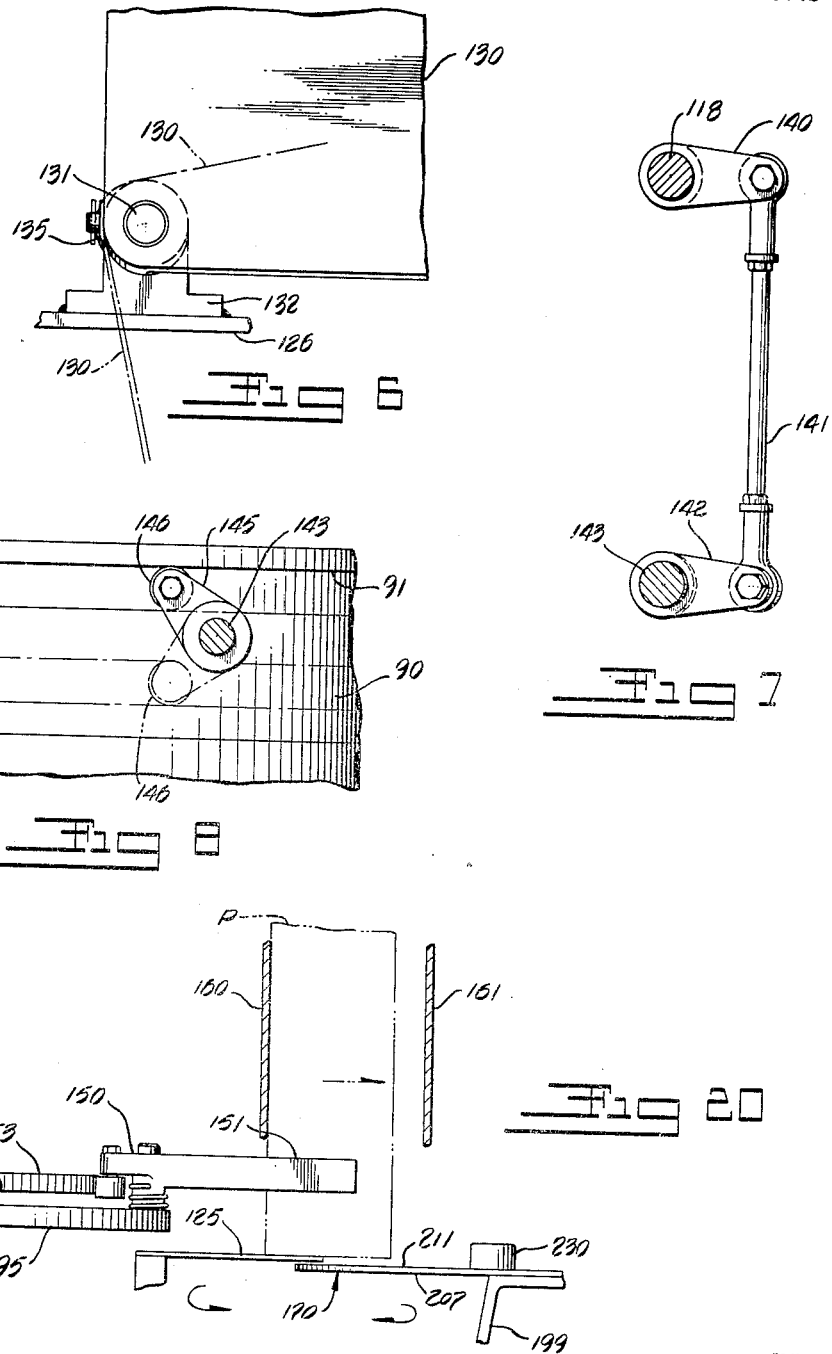

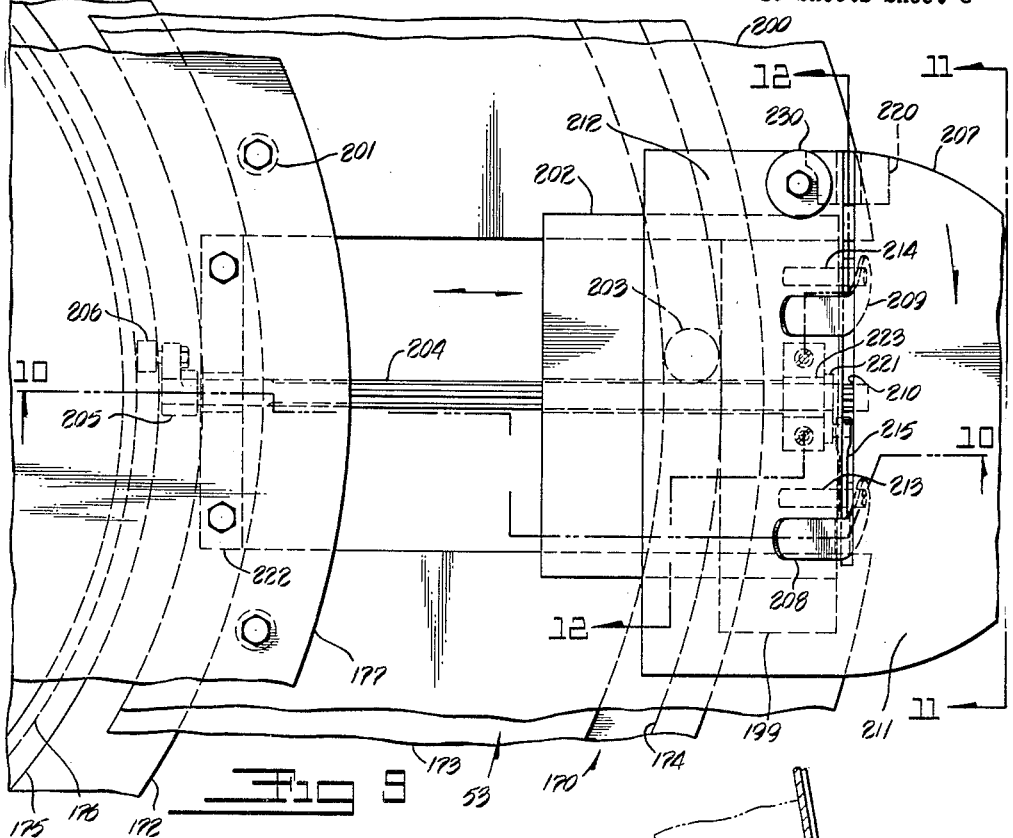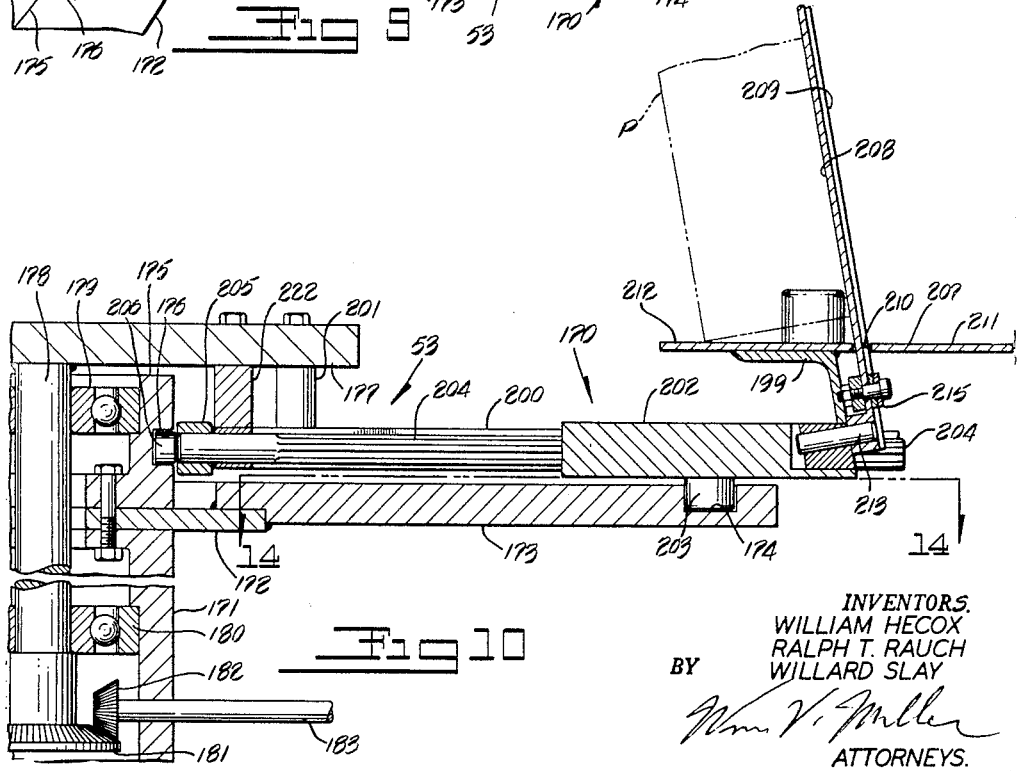

Nov. 22, 1960   W. HECOX ET AL   2,961,096
HIGH-SPEED CHECKWEIGHING AND CLASSIFYING SYSTEM
Filed Jan. 22, 1957   13 Sheets-Sheet 6

INVENTORS.
WILLIAM HECOX
RALPH T. RAUCH
WILLARD SLAY
BY
ATTORNEYS.

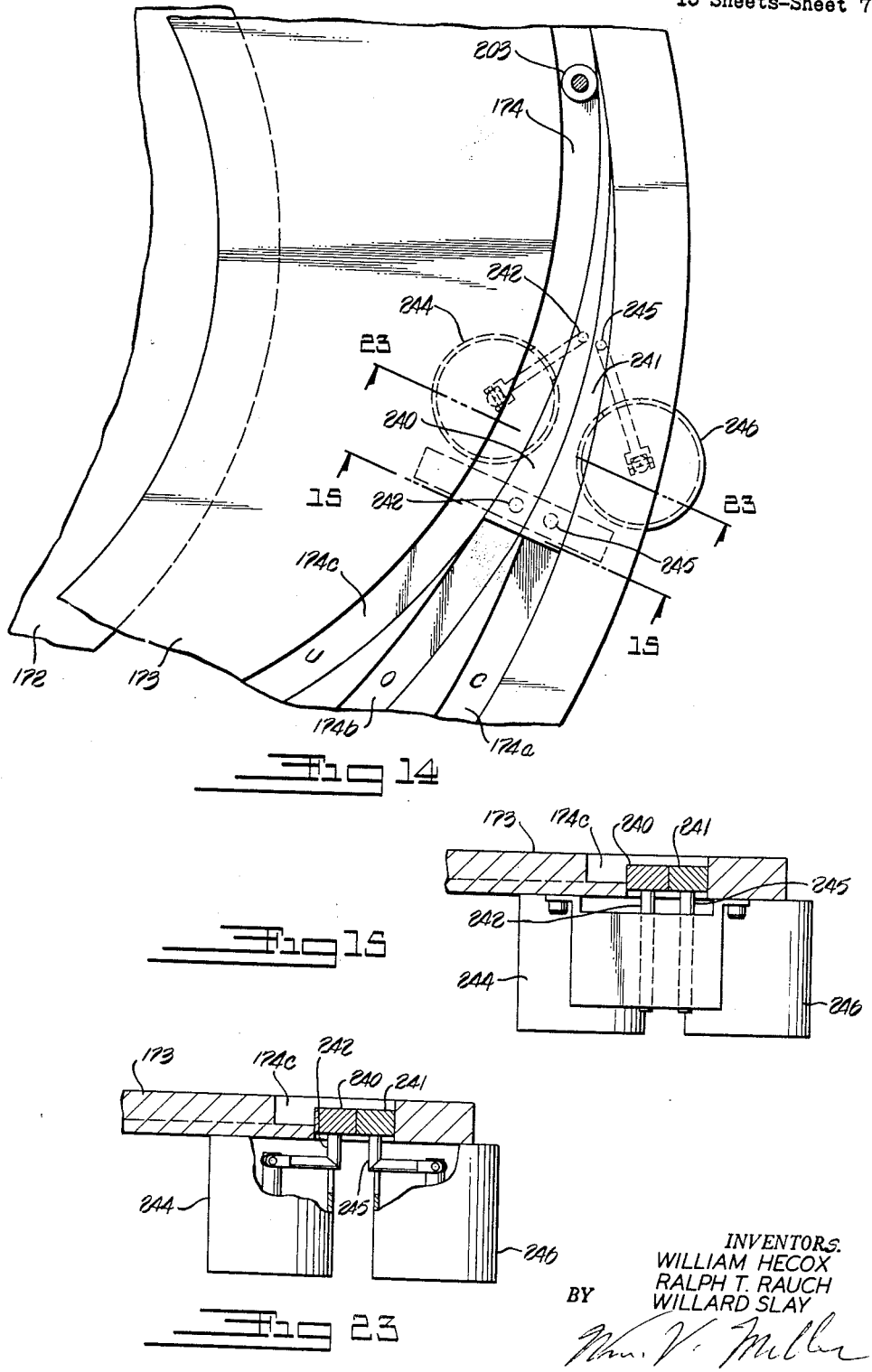

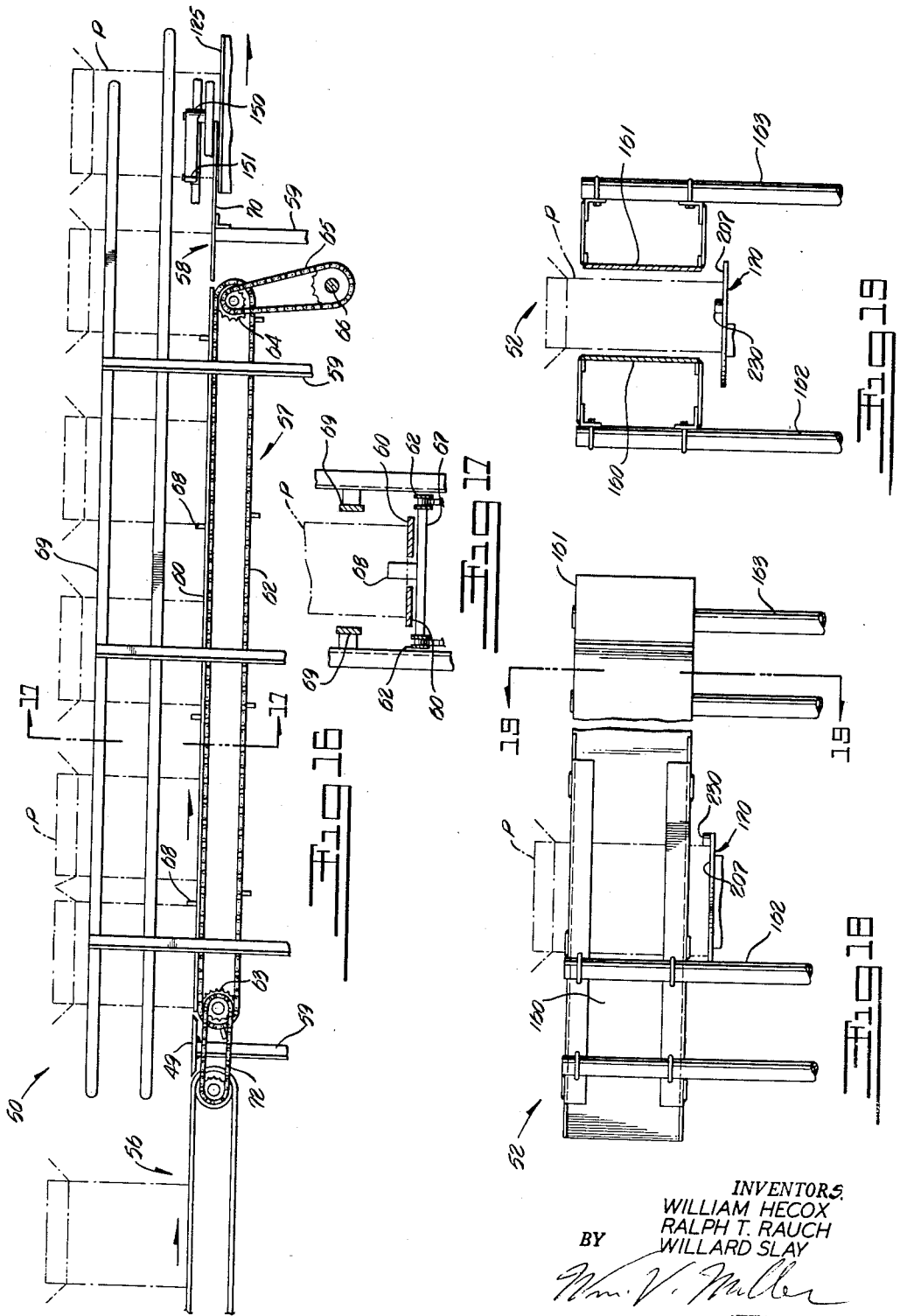

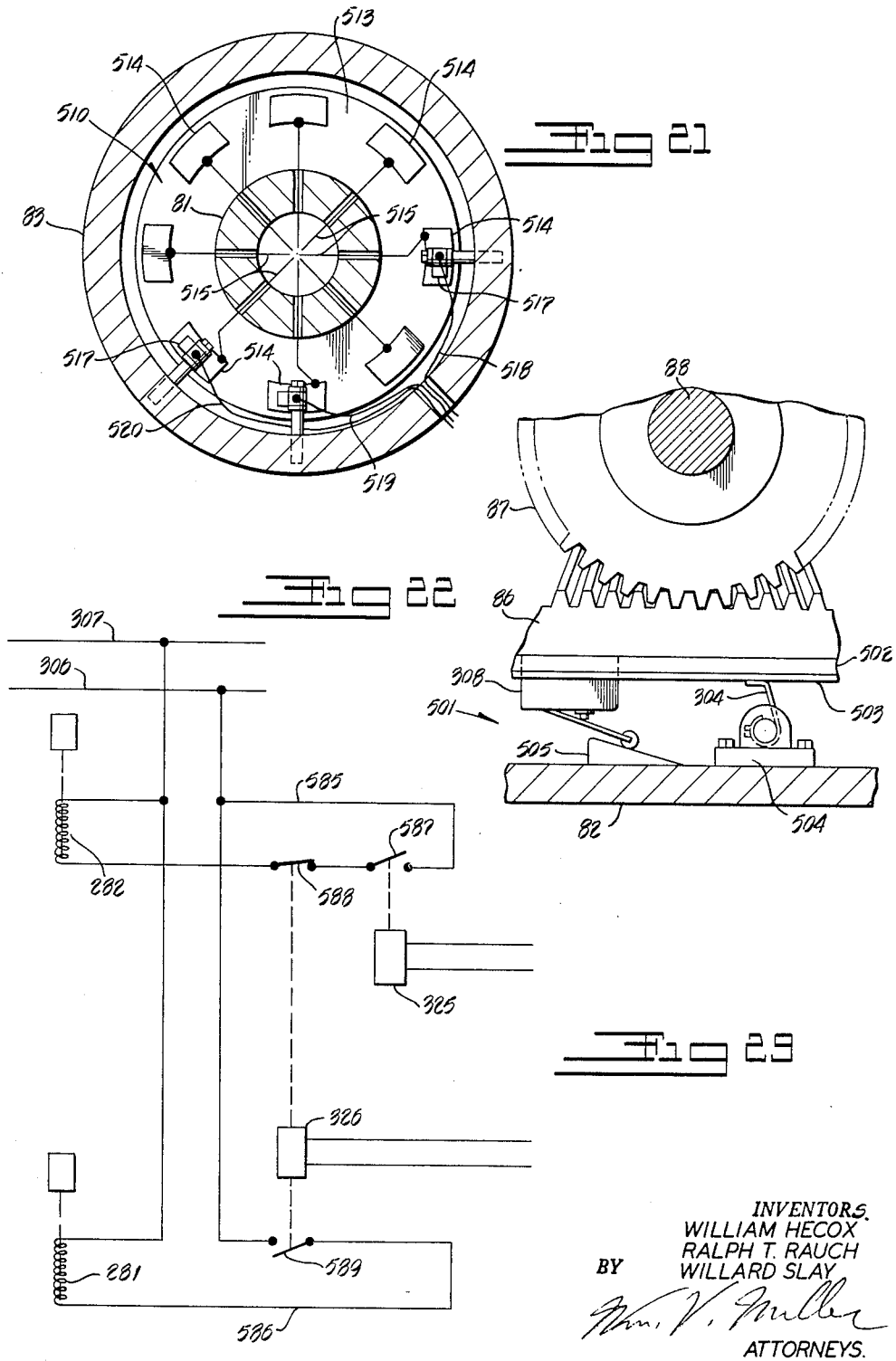

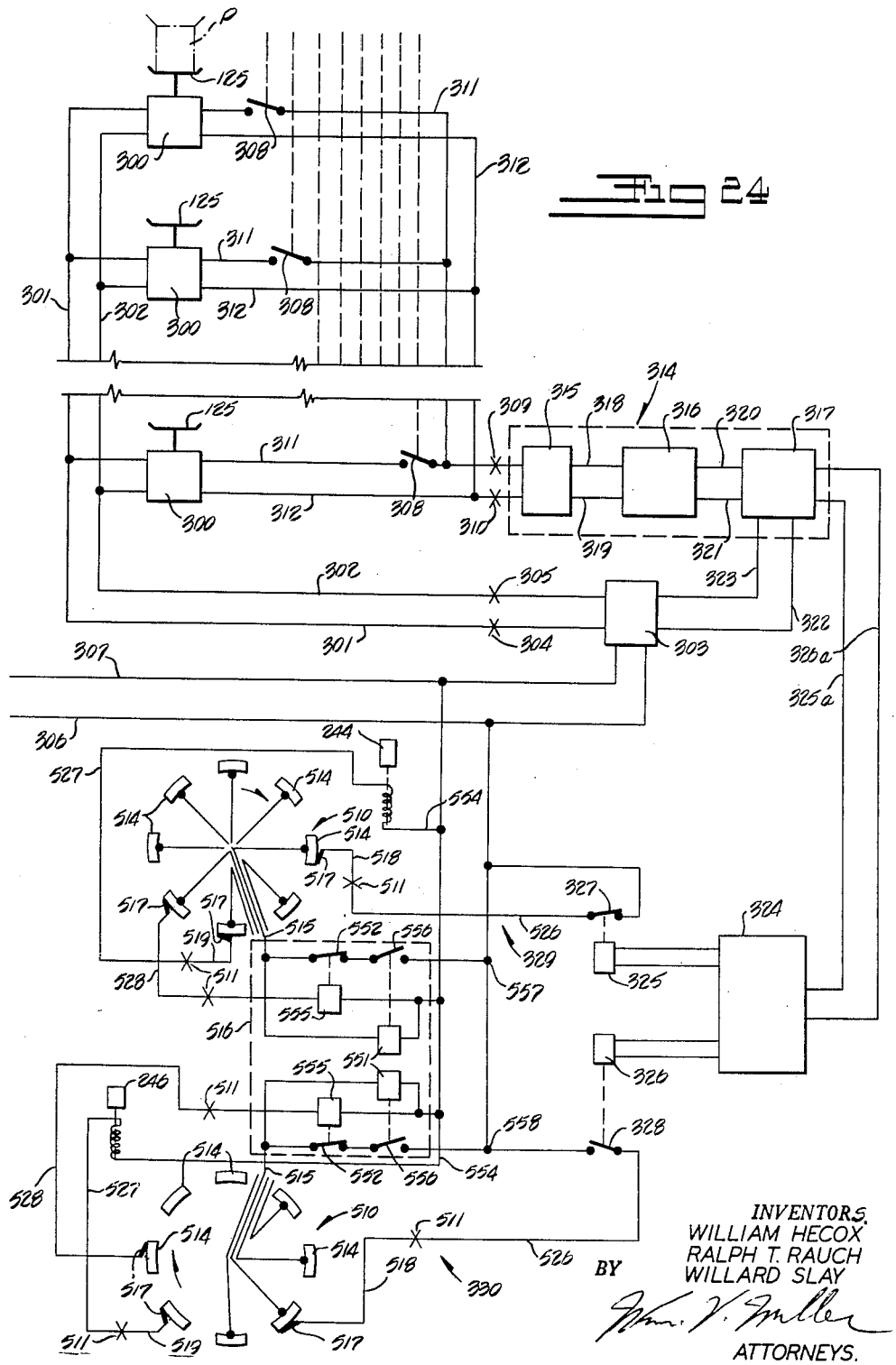

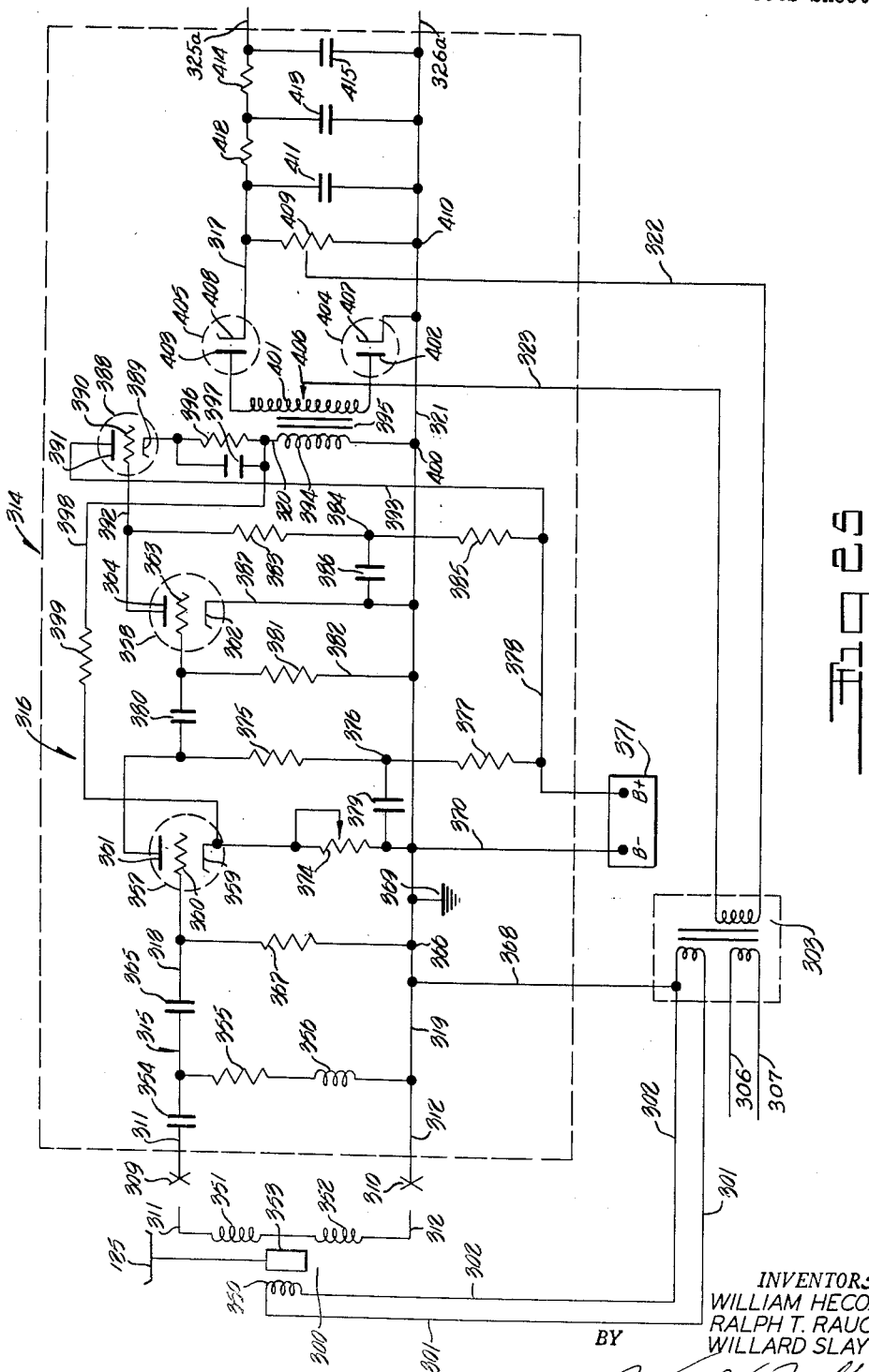

Nov. 22, 1960 W. HECOX ET AL 2,961,096
HIGH-SPEED CHECKWEIGHING AND CLASSIFYING SYSTEM
Filed Jan. 22, 1957 13 Sheets-Sheet 12

INVENTORS.
WILLIAM HECOX
RALPH T. RAUCH
WILLARD SLAY
BY
ATTORNEYS.

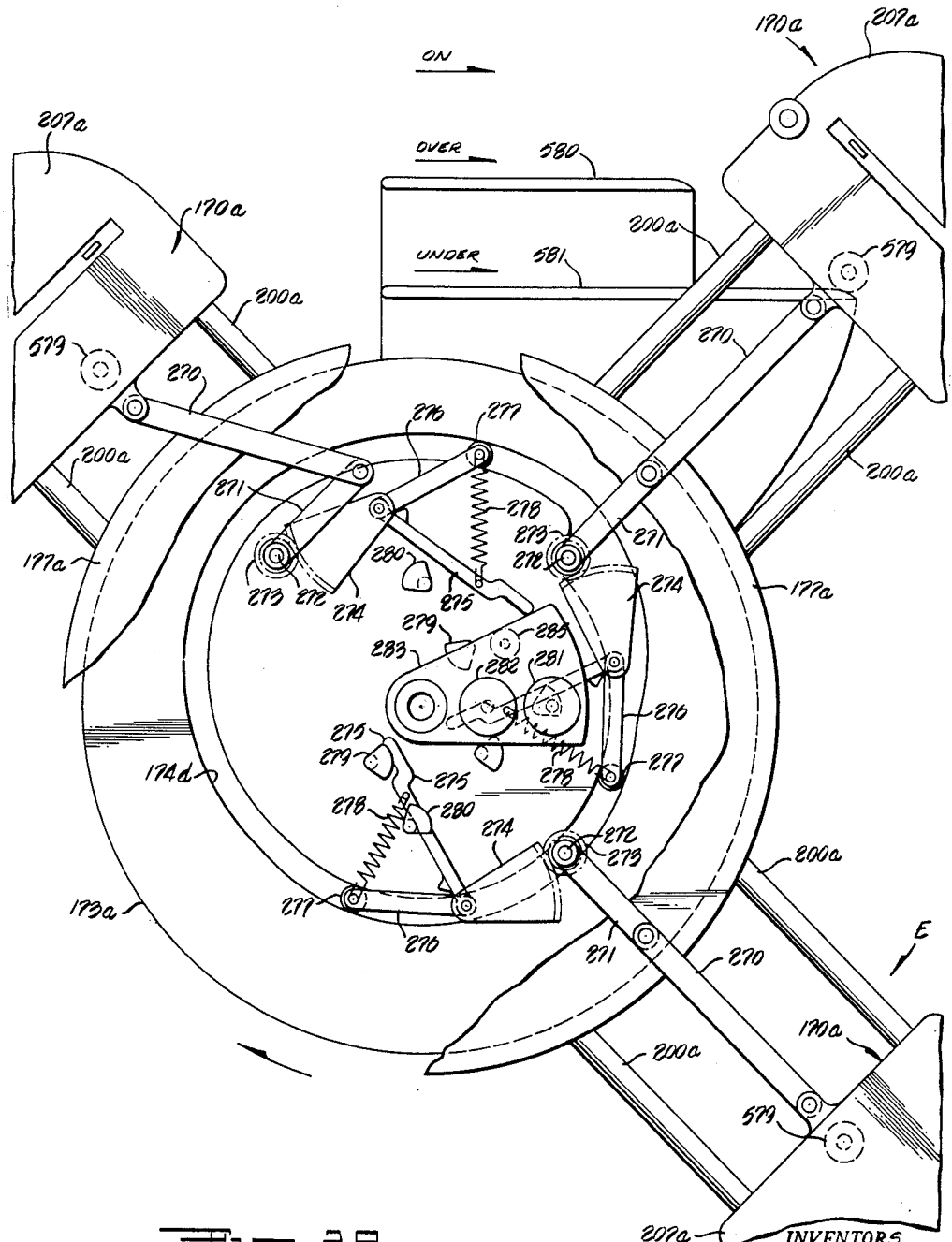

United States Patent Office 2,961,096
Patented Nov. 22, 1960

2,961,096

HIGH-SPEED CHECKWEIGHING AND CLASSIFYING SYSTEM

William Hecox, Ralph T. Rauch, and Willard Slay, Columbus, Ohio, assignors, by mesne assignments, to National Industrial Product Company, a corporation of Ohio Filed Jan. 22, 1957, Ser. No. 635,383

60 Claims. (Cl. 209—121)

Our invention relates to a high-speed checkweighing and classifying system. It has to do, more particularly, with a machine for receiving units, which are supposed to have a predetermined physical characteristic such as unit weight, for example, packages containing various products, checking the weight thereof, and classifying and separating the units according to whether they are correct weight, overweight, or underweight.

There is an increasing need in industry for high-speed checkweighing systems and this need has been brought about by factors that are fundamentally economic. To cut costs of production, manufacturers have increased the number of units produced per man-hour. It often is advisable to have these units weighed to determine if they meet minimum specifications as laid down by law or contract, and to prevent the uneconomic exceeding of these specifications which results in giving to the customer more than it pays for. Also, checkweighing to insure that each unit reaching the customer has a predetermined physical characteristic, such as minimum weight, contributes to good will developed by customer satisfaction.

Food and soap powder packaging industries are among the foremost in industry who need an efficient high-speed checkweighing and classifying system. These industries have been filling and checkweighing packages at rates of between 100 and 120 units per minute. Machinery has been developed to fill packages of this nature faster than 300 packages per minute, but the development of a high-speed checkweigher and classifier to classify satisfactorily packages at this rate as correct weight, overweight, or underweight, has not occurred up to the present time.

It is the main object of this invention to provide a high-speed checkweighing and classifying system which will operate to check units according to whether they are correct weight, overweight, or underweight, and classify them according to such factors and which will operate effectively at the high speeds indicated above and which are desirable in industry at the present time.

Various other objects will be apparent from the following description and the drawings.

According to our invention the high-speed checkweighing and classifying system comprises an input conveyor which will feed the packages into the system in predetermined timed or spaced relationship. It also includes a rotary checkweigher which has a plurality of weigh scales equally spaced angularly therearound for receiving the correspondingly spaced packages from the input conveyor. On this rotary checkweigher during the travel of each scale with a package thereon from the input station to a transfer station, the package is checked as to whether it is correct weight, overweight, or underweight. At the transfer station transfer means is provided for transferring the checked packages from the rotary checkweigher to a rotary classifier. This classifier is provided with classifying units corresponding in number to the weighing scales and similarly angularly spaced on the rotary classifier. These classifying units are actuated to classify the package on each unit in accordance with an amplified electric signal supplied to it by the weighing scale of the rotary checkweigher on which that particular package was previously checked. The classification according to weight occurs during the travel of the package on the rotary classifier from the point where it was transferred thereto from the rotary checkweigher to a point where it is associated with transfer means which serves to transfer it to an output conveyor. This output conveyor is provided with three channels to selectively receive the packages in accordance with the classification of the package as correct weight, overweight or underweight.

The preferred embodiment of our invention is illustrated in the accompanying drawings wherein similar characters of reference designate corresponding parts and wherein:

Figure 1 is a top plan view of a high-speed checkweighing and classifying system in which our invention is embodied.

Figure 2 is an enlarged vertical sectional view taken along line 2—2 of Figure 1 through the rotary checkweigher of our system.

Figure 3 is a view mainly in plan taken substantially along line 3—3 of Figure 2 and illustrating one of the weigh scales of the rotary checkweigher with a package retaining fence and pusher associated with the weigh pan thereof.

Figure 4 is a vertical sectional view taken along line 4—4 of Figure 3 radially through the weigh pan of the scale showing the vertically rockable package retaining fence associated therewith.

Figure 5 is a transverse vertical sectional view taken along line 5—5 of Figure 4 and showing other details of the drive to the fence for vertically rocking it.

Figure 6 is a detail in side elevation taken along line 6—6 of Figure 2 showing other details of the fence mounting, and indicating different positions of the fence.

Figure 7 is a vertical sectional view taken along line 7—7 of Figure 2 and showing linkage of the fence-rocking mechanism.

Figure 8 is a vertical sectional view taken along line 8—8 of Figure 2 showing the fence-rocking cam on the rotary checkweigher.

Figure 9 is an enlarged plan view of one of the classifying units of the rotary classifier showing the vertically movable package retaining fence and pusher associated with the classifier platform.

Figure 10 is a vertical sectional view taken along line 10—10 of Figure 9, which corresponds to the position indicated by line 10—10 of Figure 1, taken radially through the classifying unit showing the fence and pusher operating mechanism.

Figure 14 is a horizontal sectional view taken along line 14—14 of Figure 10 showing a triple cam track used in operating the classifying mechanism.

Figure 15 is a transverse vertical sectional view taken along line 15—15 of Figure 14 through the track.

Figure 16 is an enlarged elevational view of the input conveyor for the checkweigher taken along line 16—16 of Figure 1.

Figure 17 is a transverse sectional view taken along line 17—17 of Figure 16 through the spacing section of the input conveyor.

Figure 18 is an enlarged elevational view of the stationary fences used in transferring the packages from the rotary checkweigher to the rotary classifier and taken along line 18—18 of Figure 1.

Figure 19 is a transverse vertical sectional view taken along line 19—19 of Figure 18 transversely through the transfer mechanism.

Figure 20 is a vertical sectional view taken along line 20—20 of Figure 1 showing the relationship of the cooperating package-supporting platforms of the checkweigher and classifier at the time of transfer.

Figure 21 is a horizontal sectional view taken along line 21—21 of Figure 2 illustrating electrical contacts provided on the checkweigher.

Figure 22 is a vertical sectional view through the lower portion of the checkweigher along line 22—22 of Figure 2 illustrating other electrical contacts provided on the checkweigher.

Figure 23 is a transverse sectional view taken along line 23—23 of Figure 14 through the triple cam track of the classifying mechanism.

Figure 24 is a circuit diagram for the rotary checkweigher.

Figure 25 is a circuit diagram for the differential transformer amplifier used with the rotary checkweigher.

Figure 28 is a schematic plan view of the modified classifying mechanism but illustrating three of its classifying units.

Figure 29 illustrates a modification of the circuit of Figure 24 for use in connection with the modified classifying mechanism of Figures 26 to 28.

Figure 11:
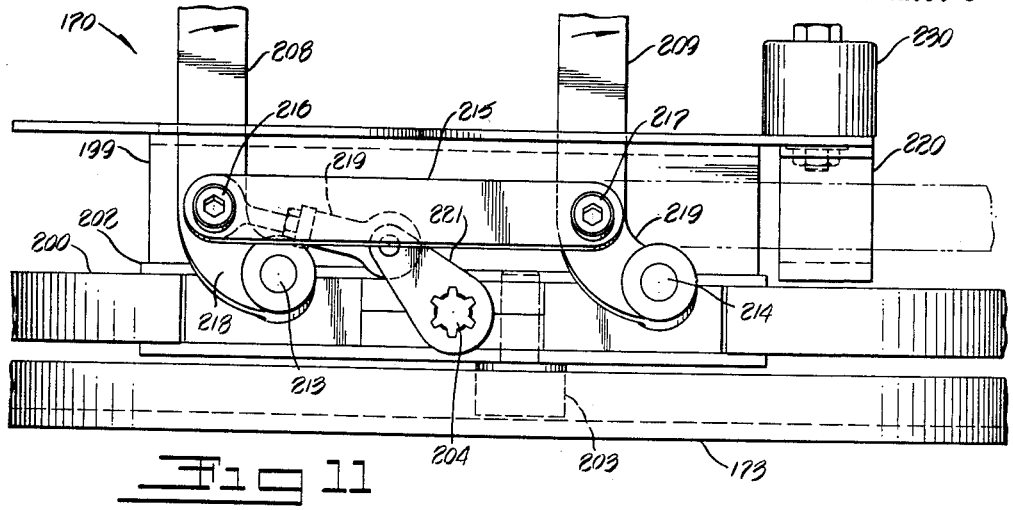
Figure 11 is an outside elevational view taken along line 11—11 of Figure 9 and showing the fence-operating mechanism.
Figure 12:
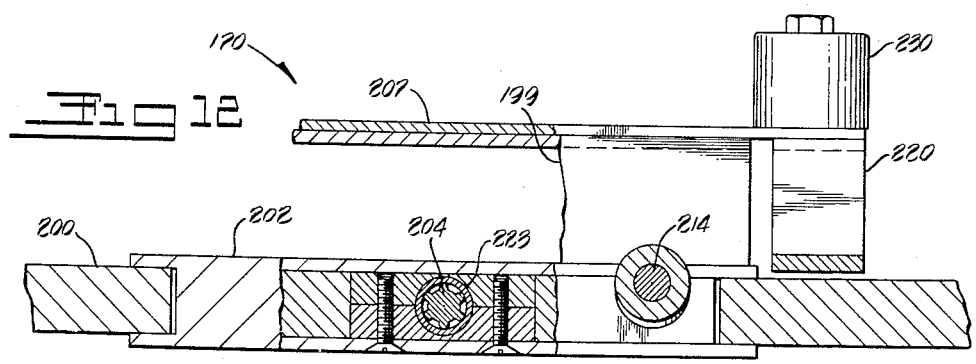
Figure 12 is a vertical sectional view taken transversely through the unit of Figure 9 along line 12—12 illustrating other details of the fence and pusher operating mechanism.

With reference to the drawings, in Figure 1 we have illustrated the general arrangement of our high-speed checkweighing and classifying system. It comprises generally an input conveyor 50, a rotary checkweigher 51, a transfer means 52, a rotary classifier 53, a transfer means 54, and an output conveyor 55. As indicated, the input conveyor 50 is a straight-line conveyor tangent to the rotary checkweigher 51 which takes the form of a rotatable turret. The rotary checkweigher 51 is almost tangent to the rotary classifier 53 which is also in the form of a rotary turret but the transfer means 52, which is a straight-line device, is disposed therebetween and is tangent to both. As will be explained later, all of these units are driven continuously and in timed relationship.

The input conveyor 50 is illustrated best in Figures 1, 16 and 17. It comprises a package supplying section 56, a timing or spacing section 57, and a bridge section 58 arranged cooperatively horizontally at the same level and in a straight line, and all of which are supported by a frame 59. The conveyor section 56 is continuously driven endless belt which feeds the packages P across a fixed plate 49 onto the laterally spaced longitudinally extending supporting plates 60 which extend the full length of the conveyor section 57. The plate 49 is provided with a notch 61 midway in its outer edge for permitting vertical passage of the lugs 68 of its conveyor section 57. The conveyor section 57 also includes a pair of laterally spaced longitudinally extending endless sprocket chains 62 which are disposed outside the plates 60 and which pass around the sprockets 63 at one end of the conveyor and the driven sprockets 64 at the other end of the conveyor. The chains 62 are driven continuously by means of a chain and sprocket 65 which drives the sprockets 64 from a variable-speed driven shaft 66. Between the two chains 62 at longitudinally spaced intervals there are connected transverse rods 67, each of which is provided midway of its ends with a projecting package engaging lug 68 that will extend upwardly between the supporting plates 60 when on the upper flight of the conveyor. These lugs 68 will serve to uniformly space the packages before they leave the conveyor section 57. Along the conveyor section 57 there is provided a fixed fence 69, at each edge thereof, to prevent lateral displacement of the packages from the supporting plates 60 as the packages are being spaced therealong by the action of the lugs 68.

The bridge section 58 of the input conveyor is in the form of a horizontally disposed package-receiving plate 70 which has a notch 71 midway of its forward edge. This notch will permit the lugs 68 of the conveyor section 57 to move downwardly therethrough as they push successive packages P onto the conveyor bridge section 58. The fences 69 also extend along the edges of the plate 70 to prevent lateral displacement of successive packages from that plate.

It will be apparent that the input conveyor will supply packages from the section 56 to the section 57 on which they will be spaced and then they will be supplied by the section 57 in timed relationship to the bridge section 58. This bridge section 58 will be so positioned relative to the rotary checkweigher 51 that the checkweigher will pick up the packages successively therefrom. The speed of the shaft 66 will be such as to operate the package spacing and timing conveyor section 57 to supply the packages in timed relationship with the operation of the rotary checkweigher 51. The conveyor section 57 may drive the conveyor section 56 through the medium of a chain and sprocket drive 72 driven from one of the sprockets 63. Thus, the section 56 will operate in timed relationship to the section 57.

The rotary checkweigher 51 is in the form of a rotatable turret 79 (Figure 2) which has a plurality of equally angularly spaced weigh scales 80, of the over-and-under weight type, which are successively moved into association with the conveyor bridge section 58 to pick-up successive packages therefrom and each of which performs the checkweighing operation as it moves from the bridge section 58 to the transfer means 52. This rotary checkweigher is illustrated best in Figures 1 to 8, inclusive.

The turret 79 includes the central hollow bearing column 81 which is upstanding from a baseplate 82. Supported by this column for rotation is the vertically disposed sleeve 83 which surrounds the column and between this sleeve and the column are the upper and lower ball bearings 84 and 85, respectively. Welded to the lower end of the sleeve 83 is a ring gear 86 with which is meshed a drive pinion 87 that is carried by a horizontally disposed drive shaft 88. The radially disposed drive shaft 88 is driven by a variable speed motor and gear unit 89. This motor also drives the shaft 66, which drives the input conveyor 50, through the ring gear 86 that meshes with a pinion 78 keyed on the inner end of the radially extending shaft 66. Thus, the input conveyor 50 will operate in timed relationship to the rotation of the rotary checkweigher 51. Surrounding the column 83 is a cam track support in the form of an annular vertically disposed skirt 90. This skirt has a cam track or groove 91 formed therein adjacent its upper edge. This skirt is attached at its lower edge to the base-plate 82 and is provided with a ball bearing 92 for supporting the end of the drive shaft 88 adjacent the pinion 87.

Attached to the upper end of the rotatable sleeve 83 for rotation therewith is a disc-like horizontally disposed supporting table 95 and this table is disposed at a level substantially spaced above the upper edge of the skirt 90. Each of the weigh scales 80 is suspended from this table 95 in its proper position angularly thereof and extending radially thereof.

Each scale 80 is suspended from the table 95 by means of a U-shape hanger bracket 96 depending from the table and rigidly secured thereto which carries on its lower end a radially extending horizontally disposed shelf 97. The inner end of this shelf has a pair of spacers 98 secured between it and the undersurface of the table 95 adjacent the sleeve 83. Positioned on a fulcrum knife-edge bearing 99 carried by the bracket 96 is a scale weigh lever 100. The weigh lever is disposed for vertical swinging movement above the shelf 97. At its outer end the lever 100 carries, by means of a knife-edge pivot bearing 101, the commodity outrider 102 and at its inner end it carries a counter-weight outrider 103 by means of a knife-edge pivot bearing 104. The commodity outrider 102 is provided with a depending check rod 105 and the counter-weight outrider is provided with a depending check rod 106 which slide vertically through the respective guide bushings 107 and 108 carried by the shelf 97. The lower ends of these rods 105 and 106 are pivoted, respectively, at the pivots 109 and 110 to the opposite ends of a check link 111 which is pivoted at 112, midway of its ends, to the depending supporting rod 113 which is rigidly connected at its upper end to the shelf 97. The inner end of the lever 100 is extended at 114 and this extension is connected to a dashpot 115 carried by the shelf 97.

It is desirable that the weigh lever 100 of each succeeding weigh scale 80 be held in a fixed vertical position at the time that the scale is being loaded with a package and at the time that a package is being removed therefrom. For this purpose a cam locking means is provided. This locking means comprises a cam plate 116 carried at the upper side of the counter-weight outrider 103 and the cam plate 126 carried by the commodity outrider 102 of each of the scales 80. Each of the plates 116 is engaged during each package transfer by a cam 117 and each of the plates 126 is engaged by a cam 120 during each package transfer. The cam 117 is keyed on the inner end of a radially disposed rock shaft 118 which is rotatably mounted at that end in a bearing bracket 119 which depends from the rotatable table 95. The cam 120 is keyed on the shaft 118 adjacent a bearing bracket 121 which is attached to the shelf 97, that rotates with the table, and rotatably supports the shaft 118 adjacent its outer end. Thus, the shaft 118 and associated parts are supported independently of the scale lever 100.

The commodity outrider 102 of each scale 80 (Figures 2 and 3) carries the package supporting platform 125. This platform is supported at a level spaced above the plate 126, carried directly on the outrider, by means of a bracket 127 which is at the inner end of the platform so that the platform projects radially outwardly above the plate 126. The outer end of the rock shaft 118 extends through an enlarged opening in the bracket 127 and the upstanding bracket 121 projects through an opening in the plate 126 so that normally vertical movement of the parts carried by the outrider 102 will be permitted without interference from the cam locking mechanism. However, when the cams 117 and 120 are rocked into contact with the respective plates 116 and 126 this relative movement will be precluded. The platform 125 is locked at a level just below the level of the bridge plate 70 so that as the checkweigher rotates, the platforms 125 of successive weigh scales 80 will sweep beneath the bridge plate 70 as shown in Figure 16.

At the outer edge of each platform 125, a fence 130 is provided for preventing the package thereon from sliding off due to centrifugal force developed during the rotation of the checkweigher 51. This fence 130 is inwardly angled relative to the platform 125 so that the package P on the platform 125 during checkweighing will be angled inwardly to prevent spilling, from the open top thereof, as shown in Figure 2. The fence is mounted for vertical rocking movement about a pivot pin 131 (Figures 4 and 5), to the outer end of which it is keyed. The pivot pin 131 is mounted in inclined position in a bearing 132 attached to the upper side of the plate 126 but disposed beneath the platform 125. The inner end of this pivot is provided with a rectangular driven member 133 which fits into a rectangular driving frame 134 and these two cooperating members form a driving coupling between the rock shaft 118 and the pivot pin 131 which permits relative angular disposition of the rockable fence 130. The opening in the frame 134 is of sufficient height relative to the driven member 133 that during the weighing operation vertical movement of the member 133 with the commodity outrider 102 will be permitted. This makes it possible to have the fence 130 carried by the scale lever without having the fence actuating mechanism carried by the scale. A leaf spring 135 is attached to the trailing edge of the bearing 132 and projects outwardly over the edge of the fence 130 adjacent its pivot 131. This spring tends to hold the fence in its upright position shown in Figures 3 and 4. However, the spring 135 will yield to permit rocking of the fence 130 as indicated by the dotted lines in Figure 6, the driving coupling being indicated in Figure 5 out of its normal position by dotted lines.

The cam mechanism for rocking the shaft 118 to thereby rock the fence 130 is shown best in Figures 2, 7 and 8. The shaft 118 has keyed thereon adjacent its inner end and next to the bearing 119 a crank arm 140 (Figures 2 and 7). This crank arm is pivoted to the upper end of an axially adjustable link 141 which passes slidably through an opening in the shelf 97 and is pivoted at its lower end to the outer end of a crank arm 142. The crank arm 142 is keyed on the outer end of radially disposed shaft 143 which is rotatably disposed in bearing brackets 144 (Figure 2) depending from the shelf 97. This shaft 143 has keyed on its inner end a crank arm 145 that carries a cam follower in the form of a roller 146 which operates in the cam track 91 that is formed in the skirt 90 as previously described. This cam track follows such a vertical path around the skirt 90 that the fence 130 of each scale 80 will be below the level of the platform 125 at the time of transfer of the package, by means to be described later, from the bridge section 58 to the weigh platform 125, and will be rocked to its upper package-retaining position by the shaft 118 as the checkweigher 51 rotates towards the transfer means 52 and as it nears that means, the fence will again be rocked, against the resistance of the spring 135, to its lower position below the scale platform 125. As each shaft 118 on each succeeding scale 80 is rocked to lower the fence 130 thereof, the cams 117 and 120 are simultaneously rocked to engage the respective plates 116 and 126 to prevent vertical oscillation of the weigh lever 100. Thus, the platform 125 of each scale will be locked in fixed vertical position at the loading point and unloading point in the rotation of the checkweigher 51 which points correspond to the location of the bridge section 58 and the transfer means 52. Furthermore, as previously indicated the cam locking means for the scale lever 100 and the fence rocking means for the fence 130 of each weigh scale 80 are supported independently of the weigh lever and will not interfere with the operation of the scale during checkweighing of the package. Thus, greater accuracy in the operation of the scales is possible.

Associated with the platform 125 of each scale 80, as shown best in Figures 1, 2 and 3, is a pusher 150, which is L-shape in plan (Figure 3). The package-engaging arm 151 of this member during a substantial portion of the rotation of the checkweigher extends radially outwardly over the platform 125 at the trailing edge thereof as shown in Figure 3. The inner arm of the pusher is pivoted at 154 to the outer peripheral edge of the rotatable table 95. At its corner, the member 150 is provided with a cam follower in the form of a roller 152 which engages the peripheral edge of a cam 153. The cam 153 is of disc-like form and is horizontally disposed being rigidly attached at its center to the column 81. Associated with the pivot 154 is a torsion spring 154a which will keep the rolller 152 in engagement with the edge of the cam. The cam is provided with a re-entrant section 156 which extends from a point just beyond the transfer bridge section 58 to a point near the transfer means 52, as shown in Figure 1. This will cause the arm 151 of each successive pusher to move slightly and out of engagement with its associated package shortly after transfer to the rotary classifier 54 at the bridge secion 58. As each scale 80 again approaches the transfer means 52, the roller 152 of the pusher 150 again engages the larger radius portion of the cam 153 and the pusher arm 151 is moved slightly forward to re-engage the package P on the platform 125. This arrangement is provided so that the pusher arm 151 will not be in engagement with the package P during the actual weighing operation on the platform 125 during which time the package can move vertically with the platform without contact with the pusher arm. The arm 151 of the pusher will be at such a level that it will move below the fence 69 as it swings over the plate 70 of the bridge section as shown in Figure 16. As the arm 151 sweeps over the plate 70, it will sweep off the package, previously positioned thereon by the input conveyor timing section 57, onto the platform 125 which will swing beneath and beyond the plate 70. Thus, transfer of a package P from the input conveyor 50 to the checkweigher 51 will be accomplished. As this transfer is accomplished, the fence 130 associated with the weigh platform 125 will be raised to its upper position, as previously indicated, to preclude sweeping of the package off the platform.

The checkweigher 51 rotating in a counter-clockwise direction will carry each succeeding package P from the input point at the transfer bridge section 58 to the transfer means 52 and during this movement of each successive package on the checkweigher, the weight of the package is checked, as will be explained later in detail.

The rotary checkweigher 51 carries certain components of the electrical control circuit of the system which are positioned in various locations. As shown in Figures 2 and 22, fastened to the bottom of the ring gear 86 are components of a slip ring unit, designated generally as 501. These components include an electrical insulator member 502, annular in shape and rigidly connected to the ring gear 86. A plurality of concentric annular conductor rings 503 are fastened rigidly to the lower surface of the insulator member 502. A mounting bracket 504, which is fastened to the base plate 82, supports a plurality of slipper contactors 304, 305, 309, and 310. At equally angularly spaced intervals around the bottom surface of the ring gear 86 is a plurality of cam switches 308. A cam member 505 is provided at one fixed position on the base plate 82 in position to operate and momentarily close the contacts of the switches 308 by means of pressure on the switch cam follower 506. Sequentially, during the rotation of the checkweigher 51 the cam member 505 closes the switches 308, closing a control circuit, to provide an electrical signal indication of the weight classification of a package, as will be described later in detail.

Additional components of the electrical control system are shown in Figures 2 and 21. Commutator and slip ring means, designated generally as 510 and 511, respectively are provided between the stationary column 81 and the rotatable sleeve 83 in tiered relationship.

Each commutator unit 510 comprises a fixed annular support member 512 having positioned thereon an annular insulator member 513 upon which is mounted a plurality of commutator conductor segments 514. As shown in Figure 21, the number of commutator segments 514 is made to correspond to the number of weighing positions in the checkweigher 51. The commutator segments 514 are individually connected by means of leads 515 to various electrical components (to be described later in detail), which are housed in a control unit box 516.

A plurality of commutator slipper contactors 517 are radially spaced around the inner periphery of the sleeve 83 in position to successively contact the various commutator segments 514 as the sleeve rotates about the column 81. An electrical connection is made with each contactor by means of leads 518, 519, and 520. Although only one of the commutator units 510 is shown in Figure 21, the other unit 510 is similar in all respects, and therefore is typically depicted by the unit shown in Figure 21.

The slip ring unit 511 (Figure 2) comprises a plurality of conductor rings 521 mounted on an annular insulator member 522 which is supported by an annular flange member 523 that is fastened to the column 81, and a plurality of slipper contactors 524, of a number equal to the number of slip rings 521, supported on sleeve 83 in position to make individual contact wtih the slip rings 521. Electrical lead wires 526, 527, and 528 are individually connected between the slip rings 521 and components of the electrical control circuit housed in the unit box 516.

The transfer means 52 is illustrated best in Figures 1, 18 and 19. The transfer means 52 comprises stationary fences 160 and 161 which are supported in spaced parallel relationship, by the respective frames 162 and 163. The frame 160 is tangent to the disc 95 of the checkweigher 51. At the inlet end to the transfer means 52 it will be noted that the fence 161 extends outwardly beyond the fence 160 as shown in Figure 1. The fence 160 will have its lower edge at such a level that the pushers 150 of the checkweigher 51 can pass therebeneath as they swing around with the checkweigher.

The transfer means 52 will effect the transfer of the successive packages, brought around by the checkweigher 51, to the classifier 53. This classifier is illustrated best in Figures 1, and 9 to 15. The rotary classifier is driven in a direction opposite to that in which the checkweigher 51 is driven. With reference to Figure 1, it will be apparent that the classifier is driven in a clockwise direction. It includes the classifying units 170, which are in the same number as the checkweighing scales 80 on the checkweigher 51, that is, eight. These eight units 170 are angularly spaced on the classifier exactly the same as the eight scales 80 on the checkweigher 51. It will be noted in Figure 1 that the classifier 53 is somewhat greater in diameter than the checkweigher 51 but the angular spacing of the cooperative units 80 and 170 are the same. During rotation of the classifier 53, the classification of the package is effected as to whether it is correct weight, overweight, or underweight, as will be explained in detail later.

The classifier 53 comprises a turret which includes the upstanding supporting housing 171 (Figure 10). Rigidly attached to the upper edge of this housing is a cam supporting disc 172 which projects outwardly horizontally therefrom. Rigidly attached to the periphery of this disc 172 is an annular flat horizontally disposed classifier cam track member 173 which has a classifier cam track in the form of a continuous groove 174 formed in the upper surface thereof. Rigidly secured above the disc 172 is a fence operating cam member 175 in the form of a vertically disposed skirt which has a cam track in the form of an endless groove 176 formed in the outer vertical surface thereof. Spaced above the cam 175 and rotatable relative thereto is a main supporting and driving disc 177. This disc 177 will support the various radially extending classifier units 170 and will carry them around relative to the cam member 173.

The member 177 (Figures 1 and 10) is rigidly attached to the upper end of a shaft 178 which is rotatably mounted in the housing 171 in ball bearings 179 and 180. The lower portion of the shaft 178 has a bevel gear 181 keyed thereon which is driven by a meshing bevel pinion 182 keyed on the inner end of a drive shaft 183 which is rotatably supported by the housing 171 and extends radially outwardly therethrough. The shaft 183 extends radially to the ring gear 86 of the checkweigher 51 and has a pinion 188 keyed thereon which meshes with the ring gear. Thus, the disc member 177 of the classifier 53 will be driven in timed relationship to the rotation of the table 95 of the checkweigher 51 but in an opposite direction.

Each of the classifying units 170 (Figures 9 and 10) comprises a slide arm member 200 which extends radially above the cam member 173 and which has its inner end rigidly suspended from the periphery of the disc 177 by means of the spacer and bolts 201. This arm carries a slide shoe 202 which is mounted for radial sliding movement thereon. The lower surface of this shoe carries a cam follower in the form of a roller 203 mounted on a vertical axis and disposed in the cam groove 174 carried by the classifier cam member 173. Rotatably mounted in the arm 200 and both slidably and rotatably mounted in the shoe 202 is a radially extending spline rock shaft 204. This shaft 204 has a rock arm 205 keyed thereon and the outer end of this rock arm carries a cam follower in the form of a roller 206 which operates in the cam track 176 of the fence operating cam 175. Obviously, the cam 173 will serve to move the shoe 202 of each classifying unit 170 radially and the cam 175 will serve to rock the shaft 204 which will operate the fences of each unit 170 as will later appear.

Supported on the shoe or carriage 202 of each of the classifying units 170 (Figures 10 to 12) is the package receiving and supporting platform 207. This platform is carried by a bracket 199 which is rigidly attached to the shoe. Fences 208 and 209 are provided in association with the platform 207 for keeping the packages in position thereon during rotation of the classifier 53 so that they will not be displaced therefrom by centrifugal force. These fences are mounted for vertical movement through a slot 210 formed in the platform 207. This slot divides the platform into an outboard section 211 which serves as a package transfer bridge and an inboard section 212 which supports the package during classifying. The fences 208 and 209 are supported by the inclined pivots 213 and 214, respectively, which are mounted in the outer edge of the shoe 202. They are linked together for simultaneous rocking movement by a link 215 pivoted thereto at the respective points 216 and 217 which are spaced above and to the left (Figure 11) of the pivots 213 and 214.

In the checkweigher one fence 130 is associated with each checkweighing unit 80 but in this instance two fences 208 and 209 are associated with the platform 207 and it will be noted that these fences are formed of narrow bars. With the lower pivot ends of the fences 208 and 209 curved to the right (Figure 11) at 218 and 219 and with the use of narrow bars as the fences, it is possible to fold the fences down clockwise within the limited space below the platform 207 without having them extend down to a level where they will interfere with the radial movement of the shoe 202 by engaging the shaft 204 or shoe 202. The fences will fold into a well or saddle member 220 as indicated by the dotted line in Figure 11.

For rocking the fences 208 and 209, a crank arm 221 is splined on the shaft 204. This shaft extends through the crank arm 221 and still projects therethrough with the shoe 202 at its outermost position as shown in Figure 10. Rocking of the shaft 204 by the cam 175 rocks the arm 221. This arm 221 is connected by a connecting rod 219 to the fences at the pivot 216. The inner end of the shaft 204 is rotatably supported in a bracket 222 (Figure 10) which depends from the disc 177. The outer end of the shaft 204 is rotatably and slidably supported within a bushing 223 (Figure 12) mounted within the shoe 202. It will be apparent from Figure 11 that the fences 208 and 209 and the link 215 are all in different vertical planes to permit downward folding. Also, the fences are inclined inwardly as shown in Figure 10 so as to tilt the package on the platform 207 inwardly to prevent spilling by centrifugal force during rotation of the classifier 53.

Associated with each of the platforms 207 is a pusher 230. This pusher 230 is in the form of a roller mounted at the trailing edge of the platform 207, within the fence slot 210, that is, in association with the outer trailing corner of the package supporting section 212 of the platform, as shown best in Figure 9.

As previously indicated, as the checkweigher 51 reaches the transfer means 52, the fence 130 of each succeeding checkweighing unit 80 releases the package P. However, at this time the package is already between the stationary fences 160 and 161, as shown in Figures 1 and 18. The package P on the platform 125 of each unit 80 will first contact the fence 161 and will be pushed between it and the fence 160 by the pusher 150 associated with that particular platform 125. At this time the roller 152 of the pusher 150 will be in contact with the larger diameter part of the cam 153 so that the arm 151 will extend straight across the platform 125 as shown in Figure 1. The shoe 202 of the cooperating classifying unit 170 will at this time be in its outermost position, because of the arrangement of the cam groove 174 of the classifying cam 173. Also, the level of the bridge area 211 of the platform 207 will be just below that of the platform 125 and, therefore, will swing under that platform, as shown in Figure 20. The checkweigher 51 and the classifier 53 are driven at the same speed of rotation, but since the classifier is larger in diameter and the unit 170 thereof receiving the package is at its outermost position, the bridge area 211 will travel at a higher speed and will catch up with and then pass beneath the platform 125 of the checkweighing unit 80 cooperating therewith. As the bridge area 211 does sweep under the platform 125 it moves beneath the package P and the platform 125 and the transfer is effected. During this transfer the fences 208 and 209, associated with the platform 207, are obviously in their lowermost positions due to the shape of the cam groove 176 in the fence operating cam 175. At this time the pusher 150 is also still in engagement with the package P. As the unit 170 continues to swing, the package is pushed against the fence 160 which will slide the package inwardly onto the area 212 of the platform 207. At this time the pusher 150 is relieved of the package, and the pusher roller 230 moves into association with the package P. Thus, as the package moves over onto the area 212 of the platform 207, the pusher 230 will come behind it and will thereafter push it. The stationary fences 160 and 161 are at such a level relative to the units 170 that the pusher 230 and the platform 207 of each unit can readily sweep below them without interference. Just before each classifying unit 170 moves beyond the stationary fences 160 and 161 and the package P in each unit is moved beyond these fences, the fences 208 and 209 associated with the platform 207 are rocked upwardly outside the package to keep it in place. Then, as each succeeding unit 170 moves in a clockwise direction towards the output transfer means 54, the classification of the package on that unit is effected.

The means for effecting the classification of each package P as to correct weight, overweight, or underweight as it moves around on a classifying unit 170 includes the cam track 174. This track 174 branches into three tracks immediately after leaving the transfer means 52, as shown best in Figures 1 and 14. These three branch tracks are the outermost branch 174a for correct weight classification, the intermediate branch 174b for overweight packages, and the innermost branch 174c for underweight packages. Switching of the cam follower 203 of each succeeding unit 170 into the proper branch in accordance with whether the package P on that unit is correct weight, overweight, or underweight, results in changing the radial position of the shoe 202 and the platform 207 carried thereby. This switching is accomplished electronically, as will later appear in detail, in accordance with a signal given from the checkweighing unit 80, on the checkweigher 51, which previously checked the weight of this particular package.

The switching into the various branches of the cam track 174 is accomplished with the means shown in Figures 14, 15 and 23. The branch 174c is a continuation of the cam track 174. If a package on the unit 170 is underweight the follower 203 thereof will continue on into the branch 174c because switch bars 240 and 241 will prevent entrance into the respective branches 174b and 174a. The switch 240 is carried by the pins 242 for vertical movement on the cam 173 and is controlled by a solenoid 244. Similarly, the switch 241 is carried by the pins 245 for vertical movement and is controlled by the solenoid 246. If switch bar 240 is down and the bar 241 is up, the follower 203 will enter the branch 174b, while if both bars 240 and 241 are down, the follower will, due to centrifugal force, seek the outermost branch 174a. A detailed description of the control of the solenoids 244 and 246 to select the cam branch will be given later. Obviously, the final radial position of the platform 207 as it nears the transfer means 54 will be determined by the branch of the cam which the roller 203 follows.

Figure 13:
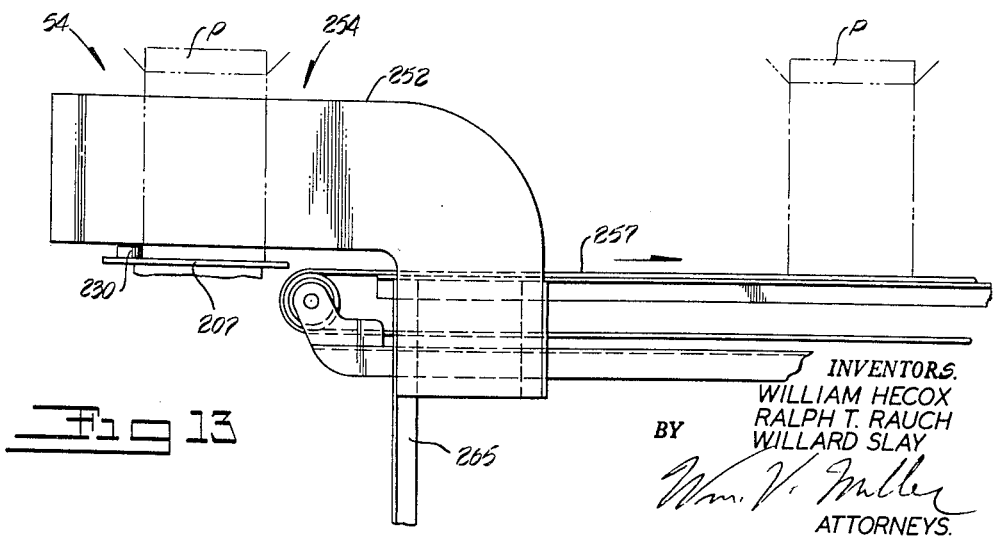
Figure 13 is an enlarged vertical sectional view taken along line 13—13 of Figure 1 through one of the classifier units as it discharges the classified package into one of the channels of the output conveyor.

The transfer means 54 is shown best in Figures 1 and 13. It comprises the stationary fences 250, 251, 252 and 253 which produce the outermost correct weight package receiving channel 254, the intermediate overweight package receiving channel 255, and the innermost underweight package receiving channel 256. These fences are so arranged that each succeeding unit 170 will sweep beneath the fences without interference therewith. Depending upon the radial position of the platform 207 of each succeeding unit, the package P thereon will be pushed by the pusher 230 into the proper channel of the channels 254, 255, and 256, since the fences are chordal to the classifier 53. The output conveyor 55 comprises the endless belts 257, 258, and 259 which are associated with the channels 254, 255 and 256, respectively for receiving the packages as each is pushed off the bridge section 211 of each unit 170. To permit this, the fences 208 and 209 are folded downwardly by the cam 175 just after the package enters the proper channel.

The endless belts 257, 258 and 259 are driven in timed relationship to the checkweigher 51 and the classifier 53. Thus, the ring gear 86 (Figure 1) of the checkweigher drives a shaft 260 by means of a bevel pinion 261 meshing therewith. This shaft extends radially to a point adjacent the conveyor and through a chain and sprocket drive 262 drives a shaft 263 which extends through the rollers that support the belts 258 and 259 at that end. This shaft 263 projects to the opposite side of the conveyor and through a chain and sprocket drive 264 drives the other conveyor belt 257. All the conveyor parts are carried by a frame 265.

The general arrangement of the circuit which is associated with the checkweigher 51 to provide the proper signals for operating the solenoids 244 and 246 (Figures 14 and 23) is shown diagrammatically in Figure 24. A differential transformer amplifier used in connection with the circuit of Figure 24 is illustrated in detail in Figure 25.

As shown in Figure 24, an electrically operated checkweigh circuit is provided to weigh each package during a period equal to about 45 degrees of rotational travel of the rotary checkweigher 51. The weigh portion of the electrical circuit is adapted to provide an amplifier phase-related alternating current signal to the solenoids associated with the classifier 53.

Packages P, that are to be weighed, are disposed for a period equal to a 180 degree rotation on the weigh pan or platform 125. Each weigh pan 125 (Figure 2) is mechanically connected to the iron slug of a differential transformer 300. The differential transformer 300 is of conventional design and is shown in more detail in Figure 25. In the checkweigher as disclosed, eight weigh positions are provided and, therefore, eight weigh pans or platforms 125 are provided in the weigh circuit. In Figure 24, three of the weigh pans 125 are typically shown as representative of all the weigh pans and the differential transformer connections in a checkweigher of any selected number of weigh positions. The primary windings of the differential transformer 300 are connected through lines 301 and 302 to the input transformer 303. The lines 301 and 302 are electrically connected through slip rings 304 and 305, respectively, that are mechanically positioned on the bottom of the ring gear 86 of the checkweigher 51 (Figure 2) as previously mentioned. The input transformer 303 is connected to a source of alternating current by the lines 306 and 307. Although the particular voltages employed are not considered critical in this invention, in an example checkweigher unit which has been constructed, the input voltage provided in the transformer 303 was 110 to 120 volts, 60-cycle alternating current. The transformer 303 was selected to provide a voltage potential across the lines 301 and 302 of 6.3 volts.

The contrawound secondary sections of each differential transformer 300 are connected through a cam switch 308 and through slip rings 309 and 310, which as previously mentioned are at the lower side of the ring gear 86, by means of parallel lines 311 and 312. The cam switch 308, as previously indicated, for each differential transformer 300 is angularly offset from other cam switches 308 and is actuated at a different angular position of the column 83 from all other switches 308. The base plate 82, as previously mentioned, is provided with the cam 505 that is adapted to progressively close the switches 308 sequentially once for each rotation of the column. The spacing of the switches 308 and the shape of the cam 505 are such that only one switch 308 may be closed at any one time. It will be seen that during rotation of the checkweigher 51 the circuit through each differential transformer 300 will be activated once for each revolution of the checkweigher.

The lines 311 and 312 are connected through the slip rings 309 and 310 to the filter section 315 of a unit designated generally, in the aggregate, as the differential transformer amplifier 314 and indicated by the dashed lines in Figure 24. The differential transformer amplifier 314 comprises the filter section 315, an amplifier section 316, and a phase-sensitive detector section 317. The differential transformer amplifier circuit 314 is shown in detail in Figure 25. The filter section 315 is connected to the amplifier section 316 by means of the lines 318 and 319. The amplifier section 316 is connected to the phase-sensitive detector section 317 by means of the lines 320 and 321. The phase-sensitive detector 317 is connected to the transformer 303 by means of lines 322 and 323 to provide a secondary tap voltage to the phase-sensitive detector 317 for comparison purposes.

The differential transformer amplifier 314 is connected to an electronic relay 324 having an adjustable bias by means of the lines 325a and 326a. The electronic relay with adjustable bias 324 is of conventional design and may be of the type shown in U.S. Patent No. 2,722,640. The electronic relay 324 controls and actuates relays 325 and 326. The relay 325 operates the switch 327 and the relay 326 operates the switch 328. As shown in Figure 24, the switch 327 controls the timing commutator circuit 329 for the solenoid 244 and the switch 328 controls the timing commutator circuit 330 for the solenoid 246. The circuits 329 and 330 are connected in parallel to the lines 306 and 307 which are connected to the source of alternating current.

The commutator timing circuits 329 and 330 are provided to assure proper timing between the weight determination or "reading" of a package P on a weight pan 125 of the checkweigher 51 and the operation of the solenoids 244 and 246 of the classifier 53. In these circuits 329 and 330, similar parts have similar functions and the circuits operate in the same manner. Therefore, while the circuits are independent from each other in operation, the description of either circuit applies to the other and, therefore, like components have been designated the same.

As shown in Figure 2 and as previously described, a contactor 517 of commutator unit 510 is connected by means of a lead 518 to a slip ring 511. The slip ring 511 is connected through a line 526 to a pole of the switch 328 in the circuit 330 and a pole of the switch 327 in the circuit 329. Each commutator segment 514 of the unit 510 is connected to a "memory" of sustaining circuit relay 551 and to one pole of a normally closed relay switch 552. The control unit 516 is shown having only two "memory" circuits, for descriptive convenience; however, one such circuit is provided for each commutator bar 514 of each timing commutator unit 510.

A second slipper contactor 517 is connected to a slip ring 511 by means of a lead 519. The slip ring 511 is connected to the solenoid 244 by means of the lead 527 in timing commutator circuit 329 and to the solenoid 246 in timing commutator circuit 330. The opposite end of each of the solenoids 244 and 246 is connected to the line 307 by means of leads 554. Another slipper contactor 517 is connected by means of a lead 527 to a slip ring 511. The slip ring 511 is connected to one side of a relay 555. The opposite side of the relay 555 is connected to the line with the second side of the relay 551. One side of relay switch 552 is connected to one side of a normally open relay switch 556 which, in turn, is connected at the opposite side to the line at a point 557 in the timing commutator circuit 329 and a point 558 in the timing commutator circuit 330.

In the normal operation of the checkweigher 51 and the classifier 53, the closing of the cam switch 308 and the consequent weight reading, or signal generation at the relay 326, will occur at a time when the classifier platform 207 is at a position removed and not sequentially next in line to pass over the cam track switches 240 and 241. Therefore, the weight reading signal is "fed into" the timing commutator units 510 which store the signal and "read it out" at the proper time to actuate the switches 240 or 241. The following description of the operation of the timing commutator unit 510 is directed primarily to that unit associated with relay 325 which remains closed when a package on the weigh pan 125 is underweight at the time of the weight reading. The commutator conductor segments 514 are so radially positioned with respect to the column 81 and the first slipper contactor 517 is so positioned with respect to the sleeve 83 that slipper contactor 517 contacts a particular commutator segment 514 at the same time that a cam switch 308 is closed by cam 505. Therefore, in the event that the package is underweight, the timing commutator circuit 329 is closed, actuating the relay 551 and closing the relay switch 556. Closing of the relay switch 556 completes the circuit to the line at point 557 which sustains the particular commutator segment 514 during further rotation of the timing commutator unit 510. After the commutator segment 514 rotates a sufficient distance that the proper time has arrived to energize the solenoid 244, the commutator segment 514 contacts the second contactor 517. This contact between the commutator 514 and the second contactor 517 closes a circuit through switches 556, 552, and solenoid 244 at the proper time.

Continued rotation of the timing commutator unit 510 causes the particular commutator bar 514 to contact the third contactor 517 which closes a circuit through the switches 556, 552, and the relay 555 causing the switch 552 to open, thus allowing the relay 551 to be de-energized and the normally open switch 556 to drop out. This operation clears the memory circuit, readying the particular commutator bar 514 for its next contact with the first contactor 517.

The insulator ring 513 is angularly adjustable with respect to the support member 512 and, therefore, the timing of the read-out electrical signal at the second contactor 517 may be timed for operation of switches 240 or 241. In addition, the position of the second contactor 517 may be angularly adjusted with respect to the first contactor 517 so that the proper delay between "feed-in" and "read-out" from the memory circuit will be provided.

In considering the operation of the electrical weighing circuit and equipment, attention will be given with particularity to an individual differential transformer 300 and it will be understood that each of the differential transformers 300 operates in exactly the same manner as the one described below with particularity in its sequential turn during the rotation of the weighing turntable. When a package P is deposited on the weigh pan or platform 125 and the weigh pan is released, the weigh pan 125 establishes itself at a balanced elevation during a period of 180 degrees rotation of the checkweigher 51. At or near the end of the 180 degree rotation, the particular cam switch 308 is closed by the cam 505 on the base plate 82 and the circuit is thereby closed through the differential transformer 300 from the transformer 303 and the A.C. source to the differential transformer amplifier 314. Because of the position of the iron slug in the differential transformer 300 a signal is transmitted through the lines 311 and 312 to the filter section 315. This signal is related in phase to the position of the weigh pan 125 and the iron slug above or below an established norm. The signal is also proportional in amplitude to the distance of the weigh pan 125 from the predetermined norm.

The signal is received and carried through the filter section 315 where undesirable higher frequencies are filtered out. The filtered signal is fed into the amplifier section 316 where it is amplified and carried through to the phase-sensitive detector section 317. The phase-sensitive detector 317 receives the amplified signal and compares its phase with the phase of the original signal received at the A.C. source and transmitted through the transformer 303. According to the phase of the signal received in the phase-sensitive detector 317, a signal is produced and transmitted to the electronic relay 324 which is proportional in amplitude to and positive or negative from a normal voltage in the degree that the package P deviates from the optimum on-weight classification. The characteristics of the signal transmitted to the electronic relay 324 determine whether the relay 325 or the relay 326, or neither of these relays, will be energized.

If the input signal to the electronic relay 324 is of sufficient amplitude and proper polarity, the normally closed relay switch 327 will open by reason of the energization of the relay 325. This condition will exist so long as the package P is heavier than the underweight limit. If the signal is of lower amplitude, the relay switch 327 will spring closed because the relay 325 will not be energized and the underweight memory circuit for the proper commutator segment will be established. At the proper time, the underweight memory circuit will energize the solenoid 244, thereby raising switch 240 and causing the roller 203 to enter the underweight cam track section 174c and the package P to enter the underweight channel 256 of the discharge-transfer means 54.

On the other hand, if the package is heavier than the underweight limit, but not heavier than the overweight limit (i.e., on weight), the relay 326 will not be energized and the normally open relay switch 328 will remain open. In this circumstance, neither of the timing commutator circuits 329 or 330 will be closed nor the memory circuits associated therewith. Therefore, at the proper "read-out" time, neither of the solenoids 244 or 246 will be energized and the roller 203 will enter cam section 174a and the package will travel uninterruptedly through the classifying unit as on weight, entering finally the correct weight channel 254.

In the event that the voltage of the signal received in the electronic relay 224 is of sufficient magnitude and proper polarity to energize the relay 326, the normally open relay switch 328 will be closed, and the proper memory circuit energized in the timing commutator circuit 330. At the proper time, the signal will be "read out" and the solenoid 246 will be energized, raising switch 241 and directing the roller 203 into the overweight classification cam track section 174b and the package P into the overweight channel 255.

Referring to Figure 25, one of the differential transformers 300 is shown more in detail as having a weigh pan 125, primary coils 350, and secondary windings 351 and 352. The weigh pan 125 is shown connected to a movable iron slug 353 between the coils 350, 351, and 352. Lines 311 and 312 lead from the secondary windings 351 and 352, respectively, through the slip rings 309 and 310 into the differential transformer amplifier 314. Lines 301 and 302 connect to the transformer 303.

As shown in Figure 25, the lines 311 and 312 from the differential transformer 300 are connected to the tuned circuit filter section 315 of the amplifier 314. The tuned circuit filter section 315 comprises a fixed condenser 354 connected in series in line 311 followed by a resistor 355 in series with an inductance 356 to the line 312.

The amplifier section 316 of the unit 314 includes an input vacuum tube 357 and a second vacuum tube 358. The input tube 357 has a cathode 359, a grid 360, and a plate 361; and the vacuum tube 358 has a cathode 362, a grid 363, and a plate 364. The line 318 from the filter section 315 to the amplifier section 316 is connected between the resistor 355 and the grid 360 of the vacuum tube 357 having a coupling condenser 365 in series therein. The line 319 from the filter section 315 to the amplifier section 316 is connected between the capacitance 356 and the point 366 on one side of a grid bias resistor 367. A low-voltage tap line 368 is provided between the line 319 and one side of the low-voltage output of the transformer 303.

The grid bias resistor 367 is connected at the point 366 to a ground 369, and by means of a line 370, to the negative side of the D.C. power supply 371. It will be apparent that lines 312, 319, 321 and 326a (the latter two to be referred to in detail later) are connected to a common side of the line being grounded by the connection 369 and, therefore, hereinafter they will be referred to as "ground." The cathode 359 of the vacuum tube 357 is connected through a potentiometer resistor 374 to the ground 369. The plate 361 is connected through a plate load resistor 375 to a point 376. One end of a voltage-dropping resistor 377 is connected to the point 376 and the opposite end is connected to the positive side of the D.C. power supply 371 through a line 378. The point 376 is connected to one side of an electrolytic by-pass condenser 379, the other side of which is connected to the ground 369.

In the second stage of the amplifier, the plate 361 of the vacuum tube 357 is connected through a coupling condenser 380 to the grid 363 of the vacuum tube 358. The grid 363 is connected through a grid bias resistor 381 to the ground 369. The cathode 362 is connected to the ground 369 by another line 387. The plate 364 of the tube 358 is connected through a plate load resistor 383 to a point 384. The point 384 is connected through a voltage-dropping resistor 385 to the positive side of the D.C. power supply 371 through the line 378. An electrolytic by-pass condenser 386 is connected between the point 384 and the line 387 which leads from the cathode 362 of the tube 358 and connects to the ground 369.

An output stage of the amplifier section 316 includes a vacuum tube 388 having a cathode 389, a grid 390, and a plate 391. A line 392 is connected between the plate 364 of the tube 358 and the grid 390 of the tube 388. The plate 391 of the tube 388 is connected to the D.C. power supply line 378 by means of a conductor 393. The cathode 389 is connected to one side of the primary coils 394 of the output transformer 395 through a cathode bias resistor 396 connected in parallel with a condenser 397. The cathode 359 of the vacuum tube 357 is also connected to the primary coils 394 by means of a line 398 having in series therein a feedback resistor 399.

The primary coils 394 are connected to the ground 369 at the point 400. The transformer 395 may be considered as the first component of the phase-sensitive detector section 317, being connected to the amplifier section 316 by means of the lines 320 and 321. The secondary coil 401 of the transformer 395 is connected at its opposite ends to the plates 402 and 403 of the rectifier vacuum tubes 404 and 405, respectively. A center tap 406 is provided on the secondary coils 401 which is connected through the line 323 to a secondary side of the input transformer 303. The rectifier tube 404 is provided with the cathode 407 and the rectifier tube 405 is provided with the cathode 408. The cathode 407 is connected to the ground 369 and the cathode 408 is connected to one side of a potentiometer 409. The other side of the potentiometer 409 is connected to the ground 369 at the point 410. The variable contact of the potentiometer 409 is connected through the line 322 to the secondary coil of the input transformer 303.

A filter condenser 411 is connected in parallel between the cathode 408 of the tube 405 and the ground 369. A resistor 412, a condenser 413, a resistor 414, and a condenser 415 are connected in series parallel relationship progressively, finally terminating in the lines 325a and 326a, which are provided for connection to the electronic relay with adjustable bias 324 (Figure 24) which operates the classifier mechanism.

The differential transformer amplifier 314 operates as follows:

The D.C. power supply 371 provides the power for the operation of the circuit. Connections to the transformer 303 provide reduced voltage alternating-current signals for comparison with the input signal from one of the differential transformers 300. A ground connection for the transformer 303 is provided by the line 363 to the ground 369 of the differential transformer amplifier circuit 314.

In the normal checkweigher operation the transformer 303 may be connected to a 60-cycle A.C. source which will provide, through lines 301 and 302, a 60-cycle alternating voltage in the coil 350 of the differential transformer 300. The position of the weigh pan 125, which is mechanically connected, as is indicated, to the slug 353 in the differential transformer 300 determines the position of the slug 353 in the coils 350, 351, and 352 of the differential transformer 300. The net voltage output of the secondary windings 351 and 352 is proportional to the displacement of the slug 353 from a predetermined norm position. When the weigh pan 125 and the slug 353 are on one side of the norm position, the output voltage of the secondary windings 351 and 352 has a predetermined phase, and when the weigh pan 125 and the slug 353 are on the opposite side of the norm position, the output voltage of the secondary windings 351 and 352 has the opposite phase. As the slug 353 moves from one side of the norm position to the other, a phase shift of 180 degrees takes place. In addition to the phase shift, the amplitude of output voltage varies proportionally to the amount of displacement from the norm.

The condenser 354, resistance 355, and inductance 356 comprise the tuned circuit filter section 315 which is established for resonance at the frequency of the input. This filter section serves to tune out undesirable frequencies produced in the differential transformer 300. A slight voltage gain is provided by the filter section 315. The voltage from the filter section 315 is connected by the line 318 through the coupling condenser 365 to the grid 360 of the vacuum tube 357 of the amplifier section 316. The amplifier section 316 is a three-stage resistance capacitance coupled amplifier having transformer output. Over-all negative feedback is provided from the cathode connected side of the primary coil 394 of the transformer 395 through the resistor 399 to the cathode 359 of the input tube 357 to stabilize the gain of the amplifier section 316. Adjustment of the magnitude of amplification may be controlled by means of the potentiometer 374.

The phase sensitive detector section 317 is a bridge rectifier circuit in which a reference voltage is inductively coupled from the transformer 303 to the potentiometer 409 and center tap of the secondary coils 401 of the transformer 395. The movable arm of potentiometer 409 is adjusted to balance the bridge circuits so that the output of the amplifier section 316 is zero when the iron slug 353 in the differential transformer 300 is at the desired normal on-weight or correct weight optimum position in the coils 350, 351, and 352, and the output from the amplifier section 316 is zero.

Because of the change in phase relation brought about by the position of the iron slug 353 in the differential transformer 300 the signal provided at the primary coils of the output transformer 395 is always either in phase or 180 degrees out of phase with the reference voltage provided through the lines 322 and 323 from the input transformer 303. Whether the phase is the same or 180 degrees out of phase depends upon whether the iron slug 353 is above or below the electrical zero position in the differential transformer 300. If the output of the amplifier section 316 into the output transformer 395 is in phase with the reference voltage, the component of the current from the amplifier section 316 is in phase with the component of the current resulting from the reference voltage through the rectifier tube 405 and is 180 degrees out of phase with the component of the current resulting from the reference voltage through the rectifier tube 404. The total current through the rectifier tube 405 is larger, therefore, than the net current through the rectifier tube 404 and the potential in the line 326a is higher than the potential in the line 325a. This difference in potential is a linear function of the position of the weigh pan 125 and the iron slug 353 of the differential transformer 300, and provides a quantitative signal to the electronic relay 324 which is proportional to the distance of the weigh pan 125 and the movable slug 353 on one side of the on-weight zero position.

Conversely, when the weigh pan 125 and the iron slugs 353 are on the opposite side of the on-weight or correct weight position the potential in the line 325a is higher than the potential in the line 326a. The signal carried by the lines 325a and 326a may thus be considered positive or negative from the zero position depending on which line has the higher potential. This variation and difference in potential between lines 325a and 326a may be utilized in the electronic relay 324 to control the grid voltage on an electron tube in the relay 324 that is connected as an electric valve controlling the magnitude of voltage of the signals to the relays 325 and 326.

Figure 26:
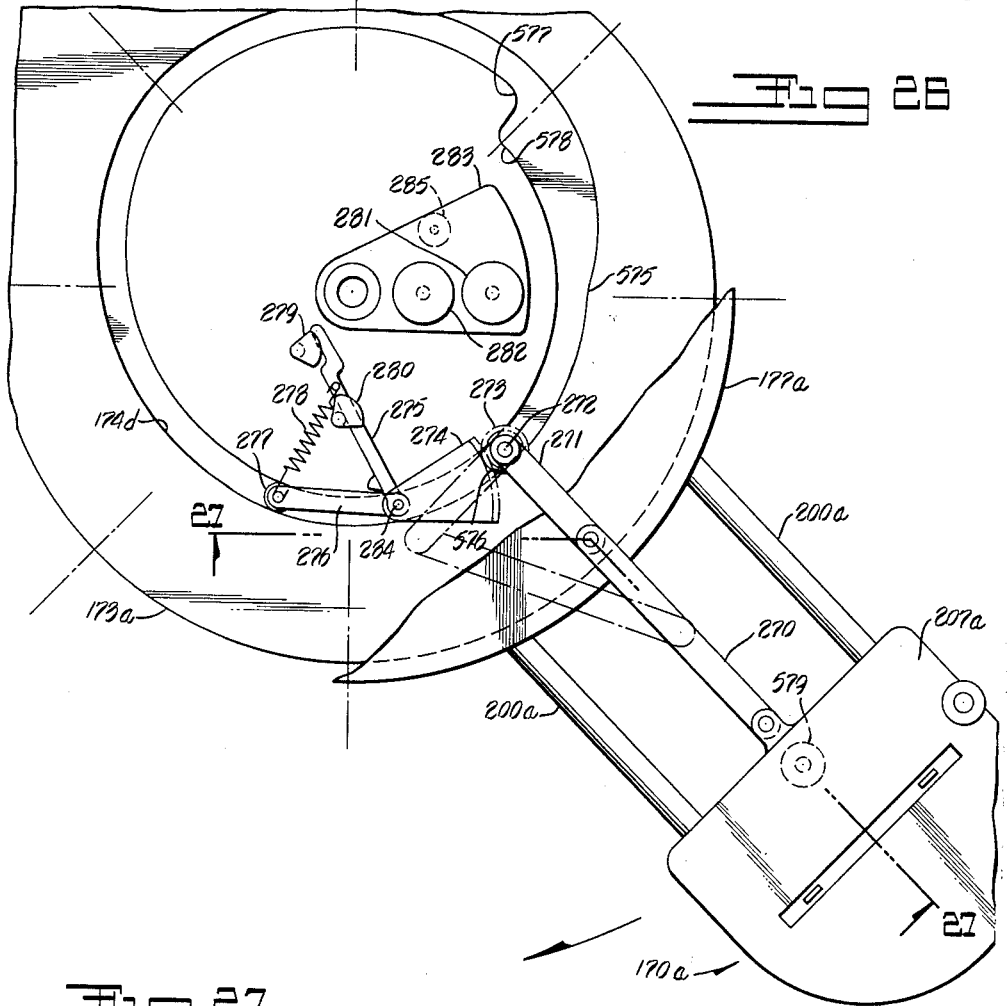
Figure 26 is a plan view illustrating the details of one of the units of a modified form of classifying mechanism in which a single cam track is used in operating the classifying mechanism.
Figure 27:
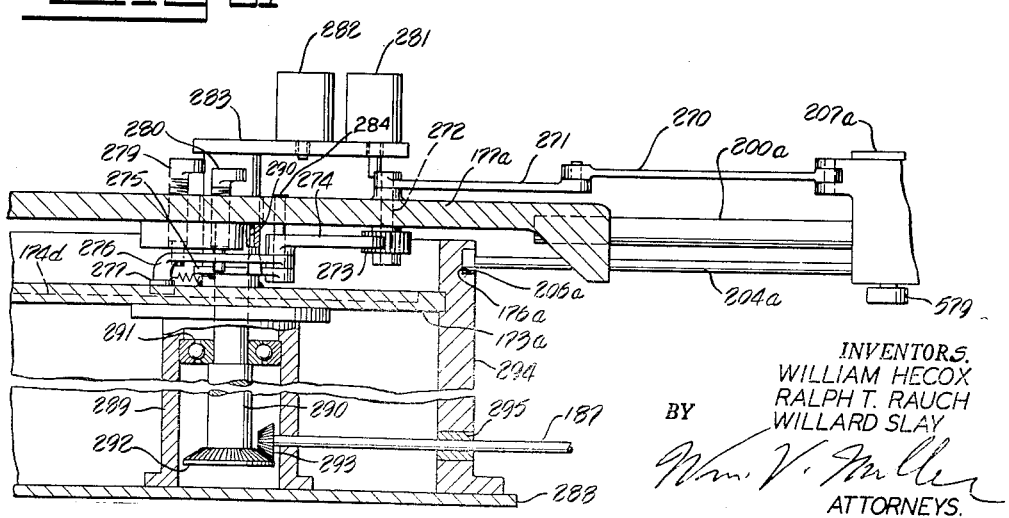
Figure 27 is a vertical sectional view taken along line 27—27 of Figure 26.

In Figures 26, 27 and 28 we have illustrated another mechanism which may be used on the rotary classifier to effect classification of the succeeding packages received thereby. In this instance, classification is accomplished with a single continuous cam track 174d. This cam track will be carried by a fixed cam member 173a and a classifier unit supporting table 177a will rotate relative thereto. This table 177a will carry the angularly spaced units 170a, one of which is shown in Figure 26 and three of which are shown in Figure 28. Each of these units 170a in general structure is similar to the units 170 described previously. However, the position of the platform 207a thereof radially is controlled by different means including the cam track 174d.

The cam track 174d varies in radial distance from the center of rotation of the table 177a. Commencing on a radial line parallel with the line of discharge from the classifier at a point 575 along the path of cam track 174d, the track remains a uniform radial distance from the center for a 45 degree clockwise segment to the point 576. Beginning at the point 576, the track 174d becomes progressively further from the center until it reaches a maximum radial distance at the point 577 which is approximately 45 degrees from the point 575 of beginning. Immediately following the point 577 of maximum radial distance, the cam track sharply decreases in radial distance on its inner side at point 578 to a radius equal to the inner cam rack minimum radius at the point 575. The outer side of cam track 174d is formed to gradually narrow the width of the track to its normal size at the point 575.

Each angularly spaced unit 17a is provided with a fence-tilting mechanism having a cam 206a operating in a cam groove 176a and rotating a shaft 204a of the type shown for the first-disclosed classifier mechanism in Figures 9, 10, 11, and 12.

Each platform 207a is mounted for radial movement on the radial guides 200a which extend outwardly from the table 177a. A link 270 is pivoted to the platform 207a and to the outer end of a crank arm 271. This arm 271 is keyed on the upper end of a crank pin 272 which is rotatably mounted in the table 177a and which has keyed on its lower end beneath the table a pinion 273 which meshes with a gear segment 274. The gear segment 274 is rocked by an override clutch mechanism which includes the arm 275 and the arm 276 which carries the cam follower 277 that operates in the cam groove 174d. The elements 270, 271, 272, 273 and 274 constitute crank arm linkage, actuated by the override clutch mechanism, for moving the platform 207a radially. A tension spring 278 is connected between the arms 275 and 276 and forms part of the clutch. Control pins 279 and 280 with cam heads are threaded down through the table 177a. Control solenoids 281 and 282 are provided on a supporting bracket 283 at a level spaced above the table 177a. The supporting bracket 283 also carries a reset roller 285 in a position below the lower surface thereof. The arm 275 is substantially at right angles to gear segment 274 and is rigid therewith, being keyed to a shaft 284 which is rotatably supported in table 177a (Figure 27). Each unit 170a is provided with a cam follower 579 centrally positioned and rotatably supported at the lower side thereof.

A plurality of curvedly upstanding cam plates 580 and 581 are welded to the skirt 295 at a position (not shown) beneath the operational level of the units 170a. The upper end of the cam plates 580 and 581 are formed in longitudinal alignment with the discharge positions of the overweight discharge conveyor 258 and the underweight discharge conveyor 256, respectively.

All of the units 170a rotate continuously with the table 177a during operation. However, for purposes of describing the operation, it will be considered to commence at the position designated E in Figure 28. At this position, each unit 170a is always at its extreme outward position and a package P is deposited on platform 207a from the transfer means 52. With the unit 170a at its extreme outward position, the gear segment 274 and the arm 275 are at their most extreme clockwise positions of rotation with respect to the table 177a.

As the unit 170a rotates, the arm 276 with the cam follower 277 rotates counter-clockwise with respect to the shaft 284 and the table 177a because of the increase of the cam track 174d. The counter-clockwise rotation of the arm 276 exerts a tension force in the spring 278 which urges the arm 275 in counter-clockwise rotation about the axis of shaft 284 with respect to the table 177a. As the arm 276 rotates in a counter-clockwise direction, the gear segment 274 is rotated, causing the pinion 273, and the pinion and arm 271 to rotate clockwise. This draws the table 207a toward the center of rotation on the guides 200a.

Table 207a is shown completely withdrawn at the position opposite E.

As the unit 170a rotates through 180° from the position E to the opposite thereto, the counter-clockwise rotation of the arm 275 may be retarded by one or the other of the control pins 279 and 280. These control pins 279 and 280 are adapted to descend into the path of the counter-clockwise travel of the arm 275 upon their threaded rotation in the table 177a. This is effected as the cam heads of the pins 279 and 280 pass beneath the control solenoids 281 and 282. One of the pins is rotated if either of the solenoids 281 or 282 is energized and the armature thereof downwardly extended into the path of the cam head.

It will be seen from Figure 28 that this setting operation of either of the cam-head control pins 279 and 280 occurs when unit 170a is fully extended and at the time when the spring 278 is without tension. Immediately following this, as unit 170a progresses in rotation, increasing tension in the spring 278, produced by the cam follower 277, causes the arm 275 to rotate counter-clockwise until restrained by a control pin 279 or 280. If neither of the control pins has been set by the solenoids 281 and 282, then the table 207a will progress to its most withdrawn position, as shown opposite position E. This occurs when the package has been determined to be underweight on the checkweigher 51.

In the event that the package has been determined to be of correct weight on the checkweigher 51, the solenoid 282 is energized at the proper time, causing the control pin 280 to move downward and engage the arm 275, as shown in Figure 21. With the arm 275 engaged, the further rotational progress of the unit 170a causes the arm 276 to rotate counter-clockwise and the spring 278 to be stretched until the cam follower 277 passes beyond the point 577 in the cam track 174d. At this time, the cam follower drops inward under the urging of spring 278, contacting the side of the cam track 174d at a point 578. The unit 170a under these conditions remains at its most extended position throughout its rotational travel and deposits package P on the on-weight conveyor 257.

In the event that the package is overweight, the solenoid 281 is energized at the proper time, causing the control pin 279 to engage the arm 275 and restraining the counter-clockwise movement of the arm 275 and the gear segment 274 at a position which causes the table 207a to be withdrawn to an intermediate position, and to deposit the package P on the overweight conveyor 258.

When the table 207a becomes tangent to the line of travel of the discharge conveyor 258 or 259, under overweight or underweight conditions, the cam follower 277 engages the outer end of the cam plate 580 or 581, respectively. At the same time, the cam follower 277 passes over the point 577 in the cam track 174d. This reduces tension in the spring 278 so that the table 207a is not urged toward further withdrawal. As the table 177a continues to rotate, the cam follower 579 rolls along the outer surface of the cam plate 580 or 581, causing the table 207a to follow the path of the overweight conveyor 258 or the underweight conveyor 259, respectively, until the unit is at its extreme radial position, at which time the cam follower 207 rides off the end of cam plate 580 or 581.

When the control pins 279 and 280 pass beneath the support 283 and adjacent to the reset roller 285, the cam heads are rotated to a position of non-engagement with the arm 275 and to a position ready for setting by the solenoids 281 or 282 immediately thereafter.

This classifier is supported from the base plate 288 (Figure 27) having an upstanding centrally positioned sleeve housing 289. The shaft 290 is supported for rotation with the sleeve 289 by means of the bearing 291. The shaft 290 carries the bevel gear 292 on its lower end which is positioned to mesh with the bevel pinion 293. The bevel pinion 293 is supported and driven by the drive shaft 187 which is rotatably supported in the skirt 294 by means of the bearing 295.

When the mechanism of Figures 26, 27, 28 and 29 is used on the rotary classifier 53, a modified control-pin actuator circuit may be used as shown in Figure 29. With reference to Figure 29, we have shown only the part of the circuit which is modified as compared to Figure 24 and which is beyond the relay 324. The modified part of the circuit includes the control circuits 585 and 586 which control the pin setting solenoids 282 and 281.

These control circuits 585 and 586 do not provide for any time delay between a weight reading on the checkweigher 51 and the control-pin setting on the classifier 53. As may be seen in Figure 1, if the cam 505 for operating the switch 308 is located beneath the position R on the checkweigher 51 so that the weight reading is taken at this position, the proper table 207a will be at the position designated S on the periphery of the classifier 53. With the support plate 283 at the proper position for the control of this particular table 207a to contact the control pins 279 and 280 immediately after table 207a position is reached, no time delay or timing mechanism is required.

The on-weight control circuit 585 shown in Figure 29 comprises a normally open relay switch 587 in series with a normally closed relay switch 588 connected between one side of the line 306 and the solenoid 282. The solenoid 282 is connected at the opposite end to the line 307. The relay switch 587 is operated by the relay 325 which is connected to the electronic relay 324, as previously described. The relay switch 588 is connected to the relay 326 which is connected in the electronic relay 324. The relay 326 also operates the normally open relay switch 589, contacts for which are connected between the line 306 and one side of the solenoid 281. The other side of the solenoid 281 is connected to the other side of the line 307.

When package P is underweight, as previously described, neither the relay 425 nor the relay 326 will be energized. Therefore, neither the solenoid 281 or the solenoid 282 will be energized, and neither of the control pins 279 or 280 will be set. This will cause the table 207a of the classifier to be fully withdrawn and deposit the package P on the underweight conveyor 259.

In the event that the package is on-weight, the relay 325 will close the switch 587 and energize the solenoid 282. The solenoid 282 will set the pin 280, causing the table 207a to deposit the package P on the on-weight conveyor 257.

In the event that the package is overweight, both the relays 325 and 326 will be energized. The operation of the relay 326 closes the switch 589 and opens the switch 588. The opening of the switch 588 breaks the circuit to the solenoid 282 and closes the switch 589 completing the circuit to the solenoid 281. Activation of the solenoid 281 sets the control pin 279, causing the table 207a to deposit the package on the overweight conveyor 258.

It will be apparent from the above description that we have provided a high-speed checkweighing and classifying system including a rotary checkweigher and a rotary classifier. The packages are fed to the checkweigher in predetermined timed or spaced relationship and the weight of each succeeding package is checked as the checkweigher rotates between its input station and its discharge station. At the discharge station the packages are transferred from the checkweigher to the classifier. During travel on the classifier from its input station to its discharge station, the packages are classified as to whether they are correct weight, overweight, or underweight. This classification occurs in accordance with signals which are developed electronically during the checkweighing operation. After the packages are classified, they are discharged from the classifier and separated according to their classification.

Having thus described our invention, what we claim is:

1. A checkweighing and classifying system comprising a rotary checkweigher having a plurality of weighing scales angularly spaced thereon for receiving articles to be checkweighed, input means for feeding articles to the rotary checkweigher in timed relationship in accordance with the spacing of said weighing scales thereon, a rotary classifier having a plurality of classifying units correspinding in number to the weighing scales and correspondingly angularly spaced thereon for receiving the checkweighed articles for the purpose of classification according to weight, transfer means for transferring the checkweighed articles from the checkweigher to the classifier in timed relationship to the rotary motion of the checkweigher and classifier, means actuated by each scale during the weighing operation for developing an electric signal related to the weight of the article, means for operating each of said classifying units to classify the article thereon during rotation of the classifier in accordance with the electric signal supplied by the weighing scale which previously weighed said article, means for connecting said signal developing means to the means for operating the classifying unit corresponding to the scale which produced the signal, and an output unit disposed in cooperative relationship with the classifier for removing the articles from the classifying units thereof and separating them according to previous weight classification by the classifying units.

2. A checkweighing and classifying system according to claim 1 including means for delaying application of said electric signal to said means for operating said classifying units until the particular classifying unit reaches a predetermined position in the rotation of the classifier.

3. A checkweighing and classifying system according to claim 1 in which said connecting means connects the electric signal developing means to said operating means as the signal is developed.

4. A checkweighing and classifying system according to claim 1 in which said means for developing the electrical signal produces a voltage which is related in phase and amplitude to the position of the weighing scale relative to a normal weight position, and means for receiving the voltage and comparing it with a normal voltage before transmittal to the means for operating the classifying unit.

5. A checkweighing and classifying system comprising a checkweigher having a plurality of weighing scales thereon for receiving articles to be checkweighed, a classifier having a plurality of classifying units corresponding in number to the scale units for receiving the checkweighed articles for the purpose of classification according to weight, transfer means for transferring each weighed article successively from its scale on the checkweigher to a corresponding classifying unit on the classifier, means actuated by each scale during the weighing operation for developing an electric signal in the form of a voltage which is related in phase and amplitude to the condition of the weighing scale relative to a normal weight condition, means for receiving the voltage and comparing it to a normal voltage, means for then transmitting the compared voltage to operate the classifying unit which receives the article previously weighed by its corresponding weighing scale which created said voltage so as to classify the article in accordance with said voltage.

6. A checkweighing and classifying system comprising a rotary checkweigher having a plurality of weighing scales angularly spaced thereon for receiving articles to be checkweighed, a rotary classifier having a plurality of classifier units corresponding in number to the checkweighing units and correspondingly angularly spaced thereon for receiving the checkweighed articles for the purpose of classification according to weight, means for rotating said checkweigher and said classifier synchronously to bring the successive weighing scales into cooperative association with the successive classifier units, means for transferring the articles successively from said scales to said classifier units as they move into cooperative association means for operating each of said classifying units to classify the article thereon during rotation of the classifier in accordance with a signal supplied by the weighing scale which previously weighed said article, electric means actuated by each weighing scale during the checkweighing operation for developing said signal, means for connecting said signal developing means to said means for operating said classifying units, and an output unit disposed in cooperative relationship with the classifier for receiving the articles from the classifying units thereof according to previous weight classification by the classifying units.

7. A checkweighing and classifying system comprising a rotary checkweigher having a plurality of weighing scales angularly spaced thereon for receiving articles to be checkweighed, input means for feeding articles adjacent to the rotary checkweigher, transfer means moving with the rotary checkweigher in association with each weighing scale for transferring the articles successively from said input means onto the successive weighing scales, a rotary classifier having a plurality of classifier units corresponding in number to the checkweighing units and correspondingly angularly spaced thereon for receiving the checkweighed articles for the purpose of classification according to weight, means for rotating said checkweigher and said classifier synchronously to bring the successive weighing scales into cooperative association with the successive classifier units, means for actuating said transfer means to transfer the articles successively from said scales to said classifier units, means for operating each of said classifying units to classify the article thereon during rotation of the classifier in accordance with a signal supplied by the weighing scale which previously weighed said article, electromagnetic means actuated by each weighing scale during the checkweighing operation for developing said signal, means for connecting said signal developing means to said means for operating said classifying units, and an output unit disposed in cooperative relationship with the classifier and having separate sections for receiving the articles from the classifying units thereof according to previous weight classification by the classifying units.

8. A checkweighing and classifying system according to claim 6 in which said connecting means includes means for delaying application of said signal to said means for operating said classifying units until the particular classifying unit reaches a predetermined position in the rotation of the classifier.

9. A checkweighing and classifying system according to claim 6 in which said connecting means includes means for connecting the signal developing means to said operating means as the signal is developed.

10. A checkweighing and classifying system according to claim 7 in which each of said scales comprises a movable weighing lever having an article support thereon, said electromagnetic means for developing said signal being actuated by movement of said weighing lever, said transfer means comprising article pushers movably mounted in association with the article supports for transferring the articles successively from said input means onto said supports and for subsequently transferring the articles successively from said supports to said classifier units.

11. A checkweighing and classifying system according to claim 10 in which each of said classifying units comprises an article support for receiving the transferred article from said article support of a cooperating weighing scale and mounted for radial movement on the rotary classifier, and said means for operating each of said classifier units comprises mechanism for selectively controlling the radial position of the article support in accordance with the signal supplied thereto.

12. A checkweighing and classifying system according to claim 11 in which said mechanism for controlling the radial position of the article support of each classifying unit comprises a cam track relative to which the classifier rotates, a cam follower connected to the article support, said cam track being provided with a plurality of branches, said operating means serving to select the branch in which said cam follower will operate.

13. A checkweighing and classifying system according to claim 11 in which said means for controlling the radial position of the article support of each classifying unit comprises a single cam track relative to which the classifier rotates, a crank arm linkage connected to said article support, an overriding clutch connected to and controlling said linkage, a cam follower carried by the clutch and operating in said track, and electrically operated control pins along the path of movement of said clutch as it moves with said classifier for controlling said clutch and actuated in accordance with the signal supplied thereto.

14. A checkweighing and classifying system according to claim 11 in which said output unit sections are guide channels having inlet ends at selected positions radially of the classifier for receiving the classified articles in accordance with the controlled radial positions of the article supports.

15. A checkweighing and classifying system according to claim 14 in which the inlet ends of said channels extend over the rotary classifier so as to transfer articles from the article supports of the classifier units, and conveyors associated with said respective channels.

16. A checkweighing and classifying system according to claim 11 in which said input means comprises a conveyor for feeding the articles in spaced relationship into association with the rotary checkweigher, a bridge plate between said conveyor and the checkweigher, said means for actuating said transfer means also serving to actuate said pushers to move the successive articles from said conveyor across said bridge plate onto successive article supports of said weighing scales.

17. A checkweighing and classifying system according to claim 16 in which said transfer actuating means includes means for moving each pusher away from the article on the cooperating article support of each weighing scale during the checkweighing operation.

18. A checkweighing and classifying system according to claim 17 in which said transfer actuating means comprises a stationary cam extending around the checkweigher, and a cam follower carried by the pusher and engaging said cam.

19. A checkweighing and classifying system according to claim 11 in which the article supports of the weighing scales are platforms and the article supports of the classifying units are platforms, said rotary checkweigher and said rotary classifier being so related that the respective platforms thereof overlap each other during rotation, said transfer means effecting transfer of the articles from the successive checkweigher platforms to cooperating classifier platforms during rotation of the checkweigher and classifier.

20. A checkweighing and classifying system according to claim 19 including a transfer channel extending over the checkweigher and the classifier so that articles supported on the platforms of the weighing scales will be directed onto the platforms of the classifying units, and pushers associated with the platforms of the classifying units for engaging successive articles in the transfer channel.

21. A checkweighing and classifying system according to claim 20 in which said pushers of the checkweigher are pivotally mounted for horizontal movement with each scale article supporting platform for pushing the articles supported thereby into said transfer channel.

22. A checkweighing and classifying system according to claim 21 in which said means for rotating the checkweigher and the classifier rotates them in opposite directions toward each other, said means causing the classifying units to travel at greater angular speed than the weighing scales.

23. A checkweighing and classifying system according to claim 22 comprising a vertically movable fence associated with each of said weighing scales for normally preventing displacement of the articles supported by the platform thereof due to centrifugal force during rotation of the checkweigher, and means for moving the fence vertically to permit movement of articles onto or off the platform at selected periods during rotation of the checkweigher.

24. A checkweighing and classifying system according to claim 23 in which said fence is tilted from the vertical so as to tilt the package on the associated platform inwardly to prevent spillage during rotation of the checkweigher.

25. A checkweighing and classifying system according to claim 24 in which the fence is pivoted adjacent the outer edge of the platform for vertical rocking movement, a spring normally keeping the fence in its uppermost position where it prevents displacement of the article from the platform, said means for moving the fence vertically comprising a stationary cam extending around the rotary checkweigher, and a cam follower connected to the fence and cooperating with said cam.

26. A checkweighing and classifying system according to claim 25 in which the fence is pivoted to the weighing scale lever adjacent the platform, said means for moving the fence vertically comprising actuating mechanism for rocking the fence and including said cam follower, said actuating mechanism being carried independently of said weighing lever.

27. A checkweighing and classifying system according to claim 20 comprising a vertically movable fence associated with each of said classifying units for normally preventing displacement of the article supported by the platform thereof due to centrifugal force during rotation of the classifier, and means for moving the fence vertically to permit movement of articles onto or off the platform at selected periods during rotation of the classifier.

28. A checkweighing and classifying system according to claim 27 in which said fence is tilted from the vertical so as to tilt the package on the associated platform inwardly to prevent spillage during rotation of the classifier.

29. A checkweighing and classifying system according to claim 28 in which the means for moving the fence vertically comprises a stationary cam extending around the classifier, and a cam follower connected to the fence and cooperating with said cam.

30. A checkweighing and classifying system according to claim 29 in which said fence moving means also includes a rock shaft actuated by said cam follower and extending radially of the classifier unit, said fence being mounted on said platform for radial movement therewith, said platform being slidably mounted on said shaft for radial movement thereon, said shaft being connected to said fence by actuating mechanism including an actuating crank member splined to said shaft for slidable movement relative to said shaft with said platform.

31. A checkweighing and classifying system according to claim 30 in which the fence is mounted for vertical movement in a slot in the platform which divides the platform into an outboard article transfer section and an inboard classifying section.

32. A checkweighing and classifying system according to claim 31 in which the fence is composed of two sets of bars disposed in different vertical planes and mounted for folding relative to each other, and a saddle mounted below the platform slot for receiving and supporting the bars when they are folded downwardly.

33. A checkweighing and classifying system according to claim 25 comprising a vertically movable fence associated with each of said classifying units for normally preventing displacement of the article supported by the platform thereof due to centrifugal force during rotation of the classifier, and means for moving the last-named fence vertically to permit movement of articles onto or off the platform at selected periods during rotation of the classifier.

34. A checkweighing and classifying system according to claim 33 in which the fences of the classifier units, like those of the weighing scales, are tilted inwardly to tilt the package on the associated platforms inwardly to prevent spillage during rotation of the checkweigher.

35. A checkweighing and classifying system according to claim 33 in which the fence of each classifier unit is mounted for vertical movement in a slot spaced from the outer edge of the platform so that the platform is divided into an outboard transfer area which will overlap the cooperating platform of the checkweigher and an inner classifying area.

36. A checkweighing and classifying system according to claim 12 in which said mechanism for selectively controlling the radial position of the article support comprises movable switches provided for cooperation with said cam track to route the cam follower of the classifier unit over the proper branch of the cam track, and solenoids for operating said switches and selectively responsive to the signals received from said means for connecting the signal developing means to said mechanism.

37. A checkweighing and classifying system according to claim 36 in which the cam track comprises a main part and a branch which is a continuation thereof at all times and two other branches controlled by said movable switches so that they can be selected individually to be a continuation of said main part.

38. A checkweighing and classifying system according to claim 13 including cam means for engaging and resetting any of the control pins after said clutch is actuated.

39. A checkweighing and classifying system according to claim 38 in which said clutch controls a gear that rocks said crank arm linkage.

40. A checkweighing and classifying system according to claim 6 in which said connecting means includes a cam switch connected to said signal developing means of each weighing scale and to said means for operating the classifying units, and a cam member for actuating each of said switches successively as the checkweigher rotates.

41. A checkweighing and classifying system according to claim 40 in which the cam switches are connected to the means for operating the classifying units by commutator and slip rings associated with said checkweigher.

42. A checkweighing and classifying system according to claim 41 in which the cam switches are connected to the means for operating the classifying units by slip ring units associated with said checkweigher so that said signal is applied as it is developed to the operating means.

43. A checkweighing and classifying system according to claim 6 in which said electric signal developing means actuated by each weighing scale comprises a differential transformer having opposed windings and an iron slug attached to the weighing scale and mounted for interaction with the opposed windings.

44. A checkweighing and classifying system according to claim 43 in which each differential transformer has one winding connected to one winding of an input transformer and its opposed winding connected to said operating means, and the input transformer has another winding connected to said operating means.

45. A checkweighing and classifying system according to claim 44 in which each differential transformer has said opposed winding connected to the input of a differential transformer amplifier and the output of the amplifier is connected to the last-named winding of the input transformer.

46. A checkweighing and classifying system according to claim 45 in which the amplifier comprises a filter section, an amplifier section, and a phase-sensitive detector section, including said last-named winding of the input transformer coupled in series.

47. A checkweighing and classifying system according to claim 46 in which said first winding of the differential transformer is a primary coil connected to said first winding of the input transformer which is a secondary coil and said opposed winding of the differential transformer comprises secondary coils which are connected to the filter section of said amplifier, and said last-named winding of the input transformer is a secondary coil connected in said phase-sensitive detector section, said input transformer also including a primary coil connected to a source of A.C. voltage.

48. A checkweighing and classifying system according to claim 47 in which the phase-sensitive detector section of the differential transformer amplifier is connected to an electronic relay having an adjustable bias.

49. A checkweighing and classifying system according to claim 48 in which each of said classifying units comprises an article support mounted for radial movement on the rotary classifier, said means for operating each of said classifier units comprising mechanism for selectively controlling the radial position of the article support in accordance with the signal supplied thereto, said mechanism comprising a plurality of solenoids and relays for actuating the respective solenoids and an electronic relay connected to and selectively controlling said relays.

50. A checkweighing and classifying system according to claim 49 in which a timing circuit is provided between each solenoid actuating relay and its respective solenoid to time the actuation of the solenoid in accordance with the relative position of said checkweigher.

51. A checkweighing and classifying system according to claim 50 in which said connecting means includes a switch connected to the differential transformer of each of said weighing scales, and means for sequentially actuating said switches during rotation of said checkweigher.

52. A rotary classifier having a plurality of classifying units angularly spaced thereon, means for rotating said classifier, means for feeding articles to be classified onto successive classifying units as the classifier rotates, each of said classifying units comprising an article support mounted for radial movement on the rotary classifier as it moves therewith, means for operating each of said classifying units comprising mechanism for selectively controlling the radial position of the article support thereof as the classifier rotates, an output unit disposed in cooperative relationship with the classifier for removing the articles from the classifying units thereof and separating them in accordance with their classification, said mechanism for controlling the radial position of the article support comprising a single cam track, a crank arm linkage connected to the article support, an overriding clutch controlling said linkage, a cam follower carried by the overriding clutch and operating on said track, and electrically operated control pins along the path of movement of said clutch as it moves with said classifier for controlling said clutch.

53. A rotary classifier having a plurality of classifying units angularly spaced thereon, means for rotating said classifier, means for feeding articles to be classified onto successive classifying units as the classifier rotates, each of said classifying units comprising an article support mounted for radial movement on the rotary classifier as it moves therewith, means for operating each of said classifying units comprising mechanism for selectively controlling the radial position of the article support thereof as the classifier rotates, an output unit disposed in cooperative relationship with the classifier for removing the articles from the classifying units thereof and separating them in accordance with their classification, said output unit including guide channels having inlet ends at selected positions radially of the classifier in accordance with the controlled radial positions of the article support, said inlet ends of said channels extending over the rotary classifier so as to transfer articles from the article supports of the classifier units, and conveyors associated with said respective channels.

54. A rotary classifier according to claim 53 including a pusher at the trailing edge of each of said article supports for pushing the article thereon into the cooperating guide channel.

55. A rotary classifier having a plurality of classifying units angularly spaced thereon, means for feeding articles to be classified onto successive classifying units as the classifier rotates, each of said classifying units comprising an article support mounted for radial movement on the rotary classifier, means for operating each of said classifying units comprising mechanism for selectively controlling the radial position of the article support thereof as the classifier rotates, an output unit disposed in cooperative relationship with the classifier for removing the articles from the classifying units thereof and separating them in accordance with their classification, said article support being in the form of a platform and including a vertically movable fence associated with each of said classifying units for normally preventing displacement of the article supported by the platform thereof due to centrifugal force during rotation of the classifier, and means for moving the fence vertically to permit movement of articles onto or off the platform at selected periods during rotation of the classifier.

56. A rotary classifier according to claim 55 in which the fence of each classifying unit it tilted inwardly to tilt the package on the associated platform inwardly to prevent spillage during rotation of the classifier.

57. A rotary checkweigher comprising a plurality of weighing scales angularly spaced thereon for receiving articles to be weighed, means for rotating said checkweigher, an input unit disposed in cooperative relationship with said checkweigher for feeding articles thereto in timed relationship to the rotation thereof and in accordance with the spacing of said weighing scales thereon, said input unit comprising a conveyor for feeding the articles in spaced relationship into association with the rotary checkweigher, each of said scales having a movable weighing lever with an article support platform thereon, means for transferring the articles from the conveyor onto the article support platforms on the checkweigher, said means comprising a bridge plate between the conveyor and the checkweigher, an article pusher carried by said checkweigher adjacent to each article support platform, said pusher being movably mounted relative to the platform for pushing the articles individually from the bridge plate onto the platform, means for moving the pusher away from the article on the platform during the checkweighing operation and comprising a stationary cam extending around the checkweigher, a cam follower carried by the pusher and engaging said cam, a vertically movable fence associated with each of said checkweighing units for normally preventing displacement of the article supported by the platform thereof due to centrifugal force during rotation of the checkweigher, and means for moving the fence vertically to permit movement of articles onto or off the platform at selected periods during rotation of the checkweigher.

58. A rotary checkweigher according to claim 57 in which said fence is tilted from the vertical so as to tilt the package on the associated platform inwardly to prevent spillage during rotation of the checkweigher.

59. A rotary checkweigher according to claim 57 in which the fence is pivoted adjacent the outer edge of the platform for vertical rocking movement, a spring normally keeping the fence in its uppermost position where it prevents displacement of the article from the platform, said means for moving the fence vertically comprising a stationary cam extending around the rotary checkweigher, and a cam follower connected to the fence and cooperating with said cam.

60. A rotary checkweigher according to claim 59 in which the fence is pivoted to the weighing scale lever adjacent the platform, said means for moving the fence vertically comprising actuating mechanism for rocking the fence and including said cam follower, said actuating mechanism being carried independently of said weighing lever.

References Cited in the file of this patent

UNITED STATES PATENTS

| | | |
|---|---|---|
| 1,150,171 | Burpee | Aug. 17, 1915 |
| 1,396,221 | Ladd | Nov. 8, 1921 |
| 1,432,762 | Ladd | Oct. 24, 1922 |
| 2,013,402 | Cameron | Sept. 3, 1935 |
| 2,098,260 | Smith | Nov. 9, 1937 |
| 2,322,862 | Malhiot | June 29, 1943 |
| 2,606,657 | Berthelsen | Aug. 12, 1952 |
| 2,609,926 | Hartig | Sept. 9, 1952 |
| 2,623,636 | Pounds | Dec. 30, 1952 |
| 2,702,120 | Nordquist | Feb. 15, 1955 |
| 2,818,173 | Powell | Dec. 31, 1957 |